(12) United States Patent
Suzuki et al.

(10) Patent No.: US 10,303,709 B2
(45) Date of Patent: May 28, 2019

(54) POPULATION FORMATION METHOD, POPULATION FORMATION APPARATUS, AND COMPUTER-READABLE RECORDING MEDIUM

(71) Applicant: FUJITSU LIMITED, Kawasaki-shi, Kanagawa (JP)

(72) Inventors: Hiroko Suzuki, Kawasaki (JP); Tadanobu Furukawa, Kawasaki (JP); Tetsuro Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 307 days.

(21) Appl. No.: 15/185,426

(22) Filed: Jun. 17, 2016

(65) Prior Publication Data
US 2017/0004138 A1  Jan. 5, 2017

(30) Foreign Application Priority Data
Jul. 1, 2015 (JP) ................... 2015-132975

(51) Int. Cl.
  *G06F 17/30* (2006.01)
  *G06F 16/335* (2019.01)
(52) U.S. Cl.
  CPC ................. *G06F 16/337* (2019.01)
(58) Field of Classification Search
  CPC .............................................. G06F 17/30702
  See application file for complete search history.

(56) References Cited

U.S. PATENT DOCUMENTS

2007/0198530 A1   8/2007  Takahashi et al.
2016/0063098 A1*  3/2016  Kawanaka ........ G06F 17/30702
                                                           707/740

FOREIGN PATENT DOCUMENTS

JP  2007-219880  8/2007
JP  2009-116469  5/2009
JP  2013-196070  9/2013

* cited by examiner

*Primary Examiner* — Augustine K. Obisesan
*Assistant Examiner* — Lahcen Ennaji
(74) *Attorney, Agent, or Firm* — Fujitsu Patent Center

(57) ABSTRACT

A population formation method is disclosed. Keywords are extracted from public information of providers included as elements in a first provider group. Each element is calculated based on a predetermined attribute value. A first attribute is for the providers of the public information. The attribute value is changed with time. Each of rules set for duplicate keywords is to determine one of the attributes by using one of the duplicate keywords. Provider groups are formed for new public information based on the duplicate keywords and the rules. A provider group having a similar relationship with a first provider group is specified by a distribution of the attribute value of a different attribute from the first attribute. A new provider group corresponding to the first provider group is formed by the providers, for whom the attribute value of the first attribute corresponds to the predetermined attribute value.

7 Claims, 22 Drawing Sheets

FIG.3

| ATTRIBUTE | | | | OCCUPATION | | | | | |
|---|---|---|---|---|---|---|---|---|---|
| | | | | | JUNIOR HIGH AND HIGH SCHOOL STUDENTS | COLLEGE STUDENT | EMPLOYED PERSON | HOUSEWIFE | SENIOR | OTHERS |
| GENDER | MALE | 130000 | WITH SPOUSE | 65000 | — | — | 50000 | 0 | 10000 | 5000 |
| | | | WITHOUT SPOUSE | 65000 | 5000 | 5000 | 30000 | 0 | 5000 | 20000 |
| | FEMALE | 105000 | WITH SPOUSE | 55000 | — | — | 20000 | 30000 | 5000 | 0 |
| | | | WITHOUT SPOUSE | 50000 | 10000 | 5000 | 20000 | 0 | 5000 | 10000 |

FIG.4

| NUMBER OF BLOG ARTICLES | FEMALE JUNIOR AND SENIOR HIGH SCHOOL STUDENTS | HOUSEWIFE | RATIO OF FEMALE JUNIOR AND SENIOR HIGH SCHOOL STUDENTS |
|---|---|---|---|
| 1 | 1920 | 1685 | 0.533 |
| 4 | 473 | 139 | 0.773 |
| 5 | 376 | 95 | 0.798 |
| 6 | 310 | 74 | 0.807 |
| 7 | 259 | 61 | 0.809 |
| 8 | 213 | 52 | 0.804 |
| 9 | 184 | 45 | 0.803 |
| 10 | 155 | 38 | 0.803 |
| 11 | 136 | 33 | 0.805 |
| 12 | 121 | 30 | 0.801 |
| 13 | 107 | 27 | 0.799 |
| 14 | | | 0.795 |
| 20 | 38 | 11 | 0.776 |
| TOTAL | 6231 | 3148 | 0.664 |
| TOTAL OF 80 PERCENT OR MORE | 1378 | 333 | 0.805 |

FIG.5

| NUMBER OF BLOG ARTICLES | MALE, MARRIED AND SENIOR | FEMALE, MARRIED AND SENIOR | RATIO OF MALE, MARRIED AND SENIOR |
|---|---|---|---|
| 1 | 3396 | 2331 | 0.593 |
| 2 | 1900 | 874 | 0.685 |
| 4 | 772 | ... | 0.737 |

| | | | |
|---|---|---|---|
| 10 | 226 | 61 | 0.787 |
| 11 | 196 | 30 | 0.867 |
| 12 | 159 | 30 | 0.841 |
| 13 | 147 | 30 | 0.831 |
| 14 | 122 | 15 | 0.891 |
| 15 | 110 | 15 | 0.880 |
| 16 | 85 | 15 | 0.850 |
| 17 | 85 | 0 | 1.000 |
| 18 | 73 | 0 | 1.000 |
| 19 | 49 | 0 | 1.000 |
| 20 | 49 | 0 | 1.000 |
| TOTAL | 10578 | 4764 | 0.689 |
| TOTAL OF 80 PERCENT OR MORE | 1075 | 135 | 0.888 |

FIG.8

OCCUPATION ESTIMATE MODEL (34)

| KEYWORD | OCCUPATION SCORE | | |
| --- | --- | --- | --- |
| | JUNIOR HIGH AND HIGH SCHOOL STUDENTS | ... | OTHERS |
| CLUB ACTIVITY | 0.5 | ... | 0.01 |
| TEST | 0.45 | ... | 0.2 |
| CLASS | 0.4 | ... | 0.1 |
| ... | ... | ... | ... |

FIG.9

KEYWORD VS. USER TABLE (35)

| KEYWORD | USER ID LIST |
| --- | --- |
| CLUB ACTIVITY | 00002, 00383, ... |
| TEST | 00002, 00005, ... |
| CLASS | 00014, 00876, ... |
| ... | ... |

FIG.10

ATTRIBUTE-DETERMINED ARTICLE DB ~36

| USER ID | OCCUPATION | BLOG ARTICLES |
|---|---|---|
| 00001 | JUNIOR HIGH AND HIGH SCHOOL STUDENTS | BLOG aa1_page1, BLOG aa1_page2, ···, BLOG aa2_page1, ··· |
| 00002 | EMPLOYED PERSON | BLOG bb1_page1, BLOG bb1_page2, ··· |
| 00003 | JUNIOR HIGH AND HIGH SCHOOL STUDENTS | BLOG cc1_page1, BLOG cc1_page2, ··· |
| ⋮ | ⋮ | ⋮ |

FIG.12

| RETRIEVAL KEYWORD LIST | |
|---|---|
| ATTRIBUTE VALUE | KEYWORD |
| JUNIOR HIGH AND HIGH SCHOOL STUDENTS | CLUB ACTIVITY |
| | LESSON |
| | SCHOOL |
| | PART TIME |
| | ... |
| COLLEGE STUDENT | COLLEGE |
| | COLLEGE CLUB |
| | LESSON |
| | BOX LUNCH |
| | ... |
| EMPLOYED PERSON | WORK PLACE |
| | BOX LUNCH |
| | COMMUTING |
| | BUSINESS TRIP |
| | ... |
| HOUSEWIFE | HUSBAND |
| | KINDERGARTEN |
| | BOX LUNCH |
| | SUPPER |
| | ... |
| ... | ... |

FIG.13

ATTRIBUTE VALUE VS. KEYWORD TABLE 54-2

| ATTRIBUTE VALUE | KEYWORD | RULE |
|---|---|---|
| JUNIOR HIGH AND HIGH SCHOOL STUDENTS | CLUB ACTIVITY | ≥1 |
| | LESSON | ≥7 |
| | SCHOOL | ≥1 |
| | PART TIME | ≥1 |
| | ... | ... |
| COLLEGE STUDENT | COLLEGE | ≥1 |
| | COLLEGE CLUB | ≥1 |
| | LESSON | – |
| | BOX LUNCH | – |
| | ... | ... |
| EMPLOYED PERSON | WORK PLACE | ≥1 |
| | BOX LUNCH | – |
| | COMMUTING | ≥1 |
| | BUSINESS TRIP | ≥1 |
| | ... | ... |
| HOUSEWIFE | HUSBAND | ≥1 |
| | KINDERGARTEN | ≥1 |
| | BOX LUNCH | ≥3 |
| | SUPPER | ≥1 |
| | ... | ... |
| ... | ... | ... |

FIG.14

| NEW USER CANDIDATE LIST |
|---|
| USER ID |
| 00002 |
| 00014 |
| 00383 |
| ... |

| KEYWORD-PER-USER TABLE ||
|---|---|
| USER ID | KEYWORD |
| 00002 | CLUB ACTIVITY × 3, LESSON × 8, FRIEND × 2, GAME × 5, ... |
| 00014 | CLASS × 4, PROGRAM × 1, ... |
| 00383 | CLUB ACTIVITY × 2, GAME × 8, LESSON × 7, ... |
| ... | ... |

ATTRIBUTE ESTIMATE PER-USER TABLE _57_

| USER ID | ESTIMATES VALUE | | | ESTIMATED ATTRIBUTE |
| --- | --- | --- | --- | --- |
| | JUNIOR HIGH AND HIGH SCHOOL STUDENTS | ... | OTHERS | |
| 00002 | 0.53 | ... | 0.11 | JUNIOR HIGH AND HIGH SCHOOL STUDENTS |
| 00014 | 0.01 | ... | 0.74 | OTHERS |
| 00383 | 0.46 | ... | 0.2 | JUNIOR HIGH AND HIGH SCHOOL STUDENTS |
| ... | ... | ... | ... | ... |

| NEW USER LIST |
| --- |
| USER ID |
| 00002 |
| 00383 |
| 00876 |
| ... |

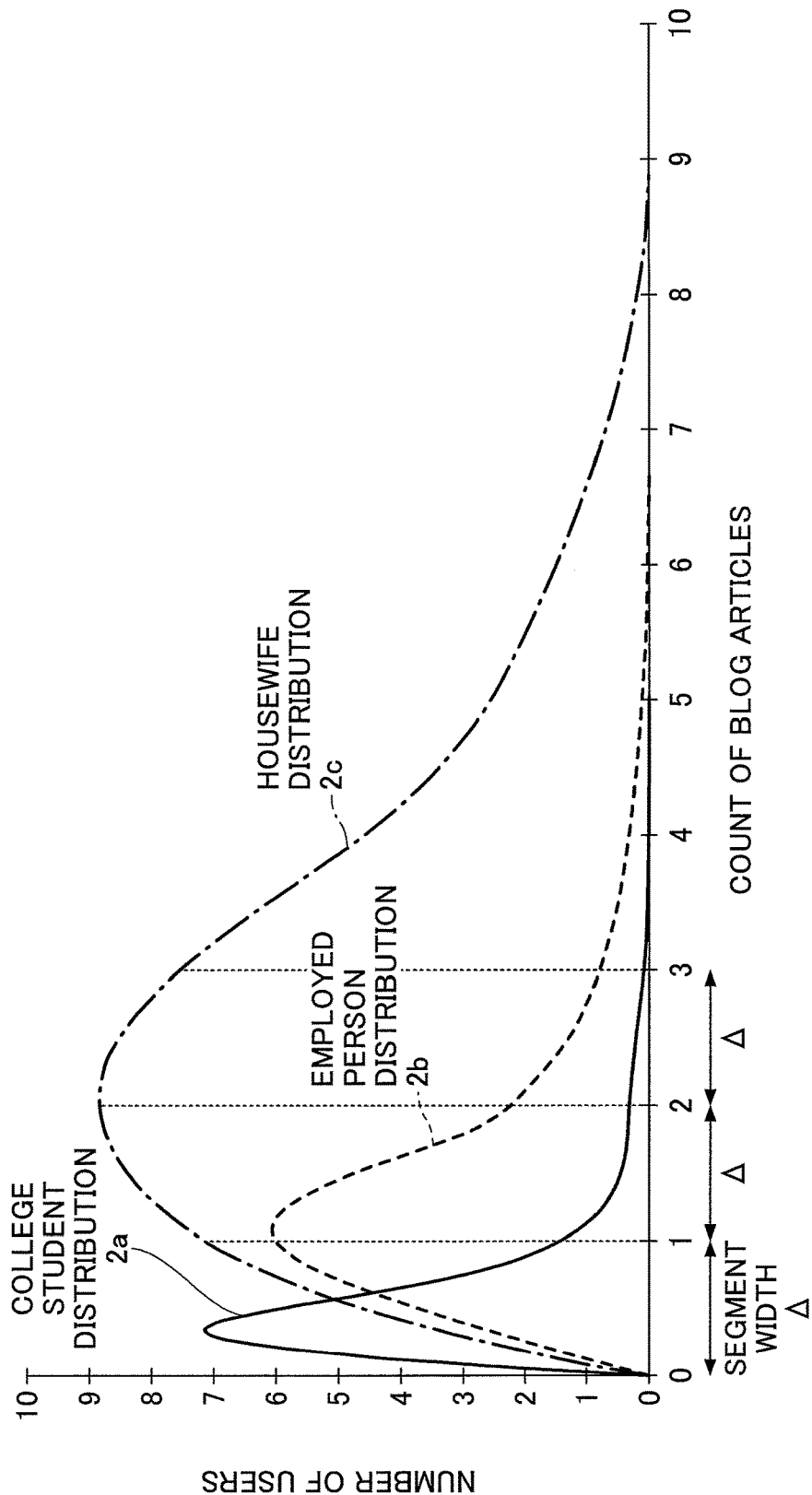

FIG.25

| ATTRIBUTE VALUE VS. KEYWORD TABLE | | | |
|---|---|---|---|
| ATTRIBUTE VALUE | KEYWORD | RULE | |
| JUNIOR HIGH AND HIGH SCHOOL STUDENTS | CLUB ACTIVITY | $\geq 1$ | |
| | LESSON | $\geq 7$ and $<12$ | ~5a |
| | SCHOOL | $\geq 1$ | |
| | PART TIME | $\geq 1$ | |
| | ... | ... | |
| COLLEGE STUDENT | COLLEGE | $\geq 1$ | |
| | COLLEGE CLUB | $\geq 1$ | |
| | LESSON | $\geq 0$ and $<2$, or $\geq 5$ and $<6$ | ~5b |
| | BOX LUNCH | $\geq 0$ and $<1$ | ~5c |
| | ... | ... | |
| EMPLOYED PERSON | WORK PLACE | $\geq 1$ | |
| | BOX LUNCH | — | |
| | COMMUTING | $\geq 1$ | |
| | BUSINESS TRIP | $\geq 1$ | |
| | ... | ... | |
| HOUSEWIFE | HUSBAND | $\geq 1$ | |
| | KINDERGARTEN | $\geq 1$ | |
| | BOX LUNCH | $\geq 3$ and $<8$ | ~5d |
| | SUPPER | $\geq 1$ | |
| | ... | ... | |
| ... | ... | ... | | ns
POPULATION FORMATION METHOD, POPULATION FORMATION APPARATUS, AND COMPUTER-READABLE RECORDING MEDIUM

CROSS-REFERENCE TO RELATED APPLICATIONS

This application is based upon and claims the benefit of priority of the prior Japanese Priority Application No. 2015-132975 filed on Jul. 1, 2015, the entire contents of which are hereby incorporated by reference.

FIELD

The embodiment discussed herein is related to a population formation method, a population formation apparatus, and a computer-readable recording medium.

BACKGROUND

Recently, a variety of users including students, housewives, employed persons, and the like use the World Wide Web (Web) to express things felt in their daily lives, their ways of thinking about matters, and the like or to exchange information among the users. For the large number of users using the Web, surveys of a market trend and the like may be conducted by using the Web to develop a product.

There are provided a technology for extracting reputation information posted by the users from text documents and the like of Web pages, a technology for predicting profile information as precisely as possible by using relationships among the users, which are acquired from an SNS (Social Networking Service) site server, and the like.

PATENT DOCUMENTS

Japanese Laid-open Patent Publication No. 2007-219880
Japanese Laid-open Patent Publication No. 2013-196070
Japanese Laid-open Patent Publication No. 2009-116469

SUMMARY

According to one aspect of the embodiment, there is provided a population formation method including: extracting, by a computer, one or more keywords from public information for each of providers included as elements in a first provider group, each of the elements being calculated as an attribute value pertinent to a first attribute corresponding to a predetermined attribute value, the first attribute being an attribute of the providers of the public information, the attribute value being changed with time; setting, by the computer, rules corresponding to duplicate keywords among multiple attribute values in the one or multiple keywords, each of the rules determining one attribute value in the multiple attribute values by using one of the duplicate keywords; forming, by the computer, one or more provider groups with respect to new public information including corresponding keywords based on the duplicate keywords and the rules; specifying, by the computer, a provider group having a predetermined similar relationship with the first provider group from the one or more provider groups based on a distribution of the attribute value of a different attribute from the first attribute; and forming, by the computer, a new provider group corresponding to the first provider group by information of the providers, for whom the attribute value pertinent to the first attribute corresponds to the predetermined attribute value, among providers included in the specified provider group.

According to other aspects of the embodiment, a computer-readable recording program and an alert transmission apparatus may be provided.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3 is a diagram illustrating an example of a reference distribution;

FIG. 4 is a diagram illustrating an example of a research result;

FIG. 5 is a diagram illustrating another example of the research result;

FIG. 8 is a diagram illustrating a data configuration example of an occupation estimate model;

FIG. 9 is a diagram illustrating a data configuration example of a keyword versus (vs.) user table;

FIG. 10 is a diagram illustrating a data configuration example of an attribute-determined article DB;

FIG. 12 is a diagram illustrating a data configuration example of a retrieval keyword list;

FIG. 13 is a diagram illustrating a data configuration example of an attribute value vs. keyword table;

FIG. 14 is a diagram illustrating a data configuration example of a new user candidate list;

FIG. 15 is a diagram illustrating a data configuration example of a keyword-per-user table;

FIG. 16 is a diagram illustrating a data configuration example of an attribute estimate per-user table;

FIG. 17 is a diagram illustrating a data example of a new user list;

FIG. 24 is a diagram for explaining an example of the rule acquisition process; and FIG. 25 is a diagram illustrating another data configuration example of the attribute value vs. keyword table.

DESCRIPTION OF EMBODIMENTS

In the following, embodiments of the present invention will be described with reference to the accompanying drawings.

An example, in which users of a Web open their opinions and the like, may be a blog (Web log). Contents of blogs on the Web may be used for surveys of product development and the like. In a survey of the product development, an adequate number of users are sampled for each of predetermined attribute values and a parent population is created. By analyzing the blogs of the users belonging to this parent population, it is attempted to have a true figure of daily situations of the users.

The attribute values of the users change with time in the parent population, as the users change from students to employed persons. Also, the users may stop updating their blogs or end their blogs.

On the other hand, in a case of surveying a trend of products in a market, it is preferable if a ratio of attribute values is maintained. Otherwise, a comparison with a previous survey result may not be precisely conducted. Accordingly, in order to correspond to the above described change and to maintain a constant attribute ratio in the parent population, a user who changes the attribute is excluded from the parent population, and the parent population is replenished with a new user having the same attribute.

However, with existing technologies for effectively extracting user information by the above described survey, it is difficult to maintain a constant attribute ratio in the parent population depending on change of the attribute values of the users with time.

Figure 1:
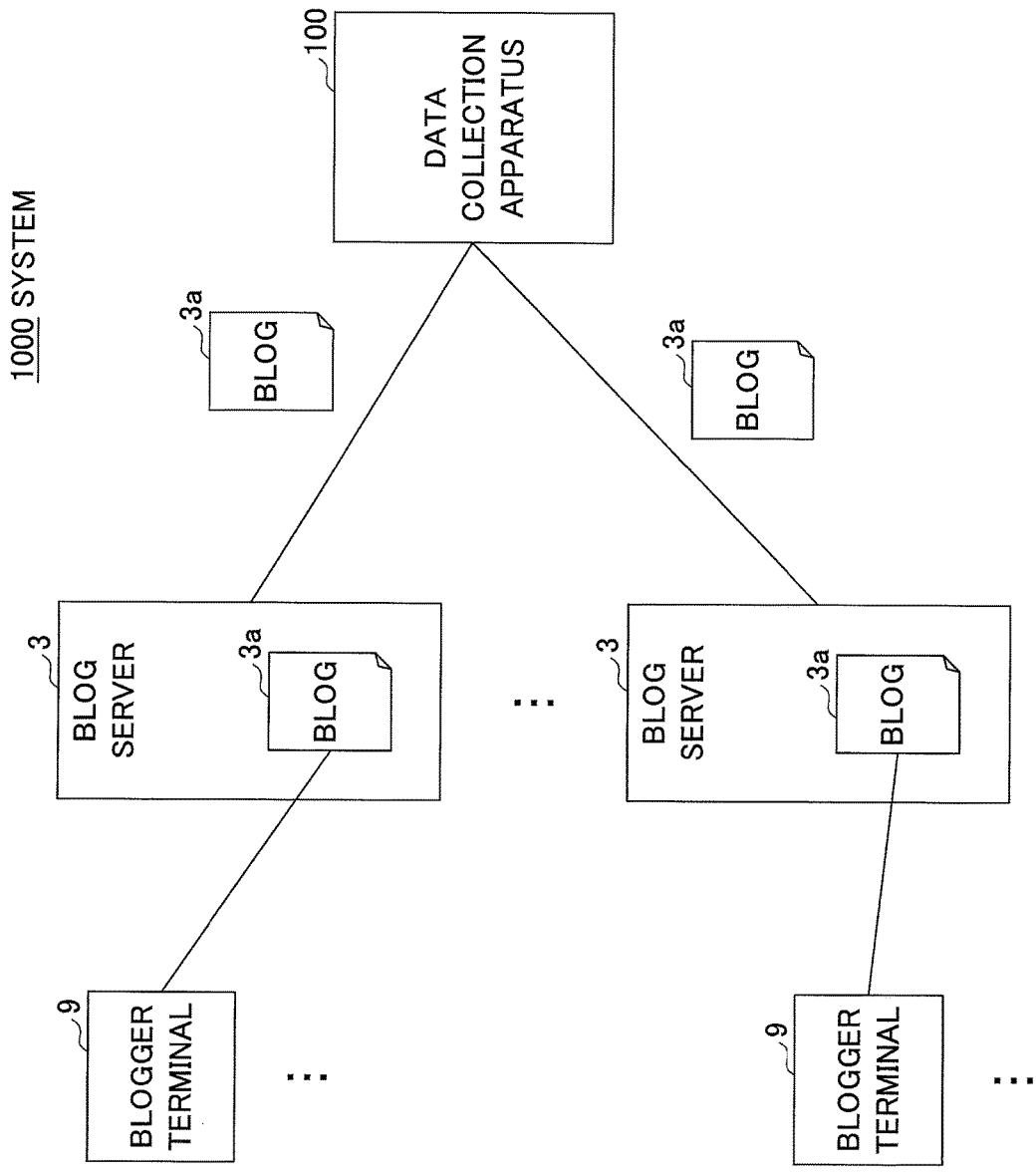
FIG. 1 is a diagram illustrating a system configuration example in an embodiment.

In the following, the embodiment will be described. FIG. 1 is a diagram illustrating a system configuration example in the embodiment. In FIG. 1, the system 1000 includes a data collection apparatus 100, one or more blog servers 3, and blogger terminals 9.

The data collection apparatus 100 connects to the one or more blog servers 3, and searches for and collects blogs 3a. The data collection apparatus 100 provides a highly reliable data set by collecting the blogs 3a.

The data set provided by the data collection apparatus 100 may be collected for the purpose of extracting reference information for product development such as preference of the users with respect to the products in the market.

Each of the blog servers 3 includes various management functions for the blogs 3a, and provides storage areas for the blogs 3a to bloggers as the users.

The blogger terminals 9 are used by the bloggers, and use services of the blog servers 3 in order for the blogger to create, update, and delete the blogs 3.

Figure 2:
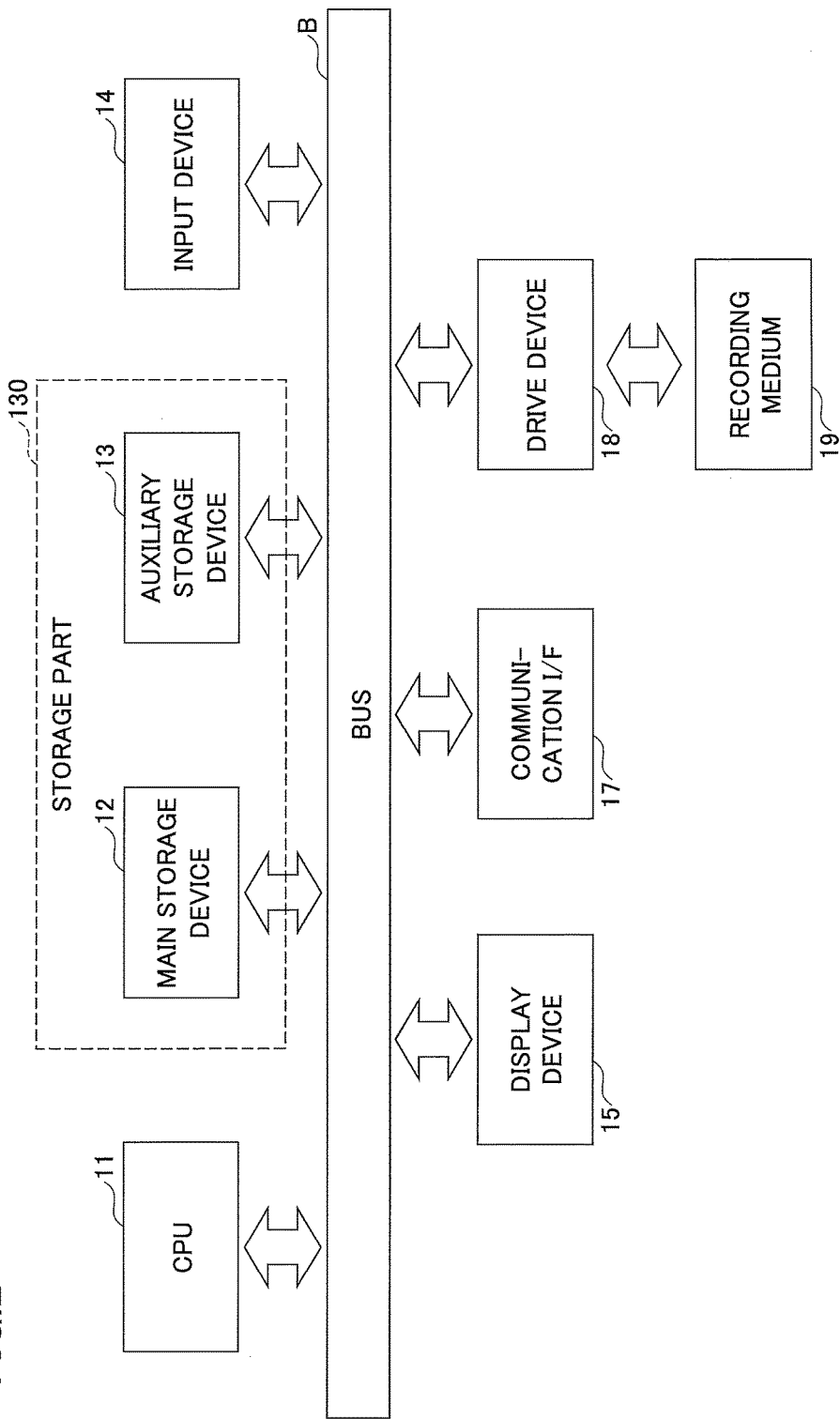
FIG. 2 is a diagram illustrating a hardware configuration of a data collection apparatus.

FIG. 2 is a diagram illustrating a hardware configuration of the data collection apparatus. In FIG. 2, the data collection apparatus 100 is an apparatus controlled by a computer, and includes a Central Processing Unit (CPU) 11, a main storage device 12, an auxiliary storage device 13, an input device 14, a display device 15, a communication InterFace (I/F) 17, and a drive device 18, which are mutually connected via a bus B.

The CPU 11 controls the data collection apparatus 100 in accordance with a program stored in the main storage device 12. For the main storage device 12, a Random Access Memory (RAM) and a Read Only Memory (ROM), or the like may be used. The main storage device 12 stores or temporarily stores the program executed by the CPU 11, data processed by the CPU 11, data acquired in a process conducted by the CPU 11, and the like.

A Hard Disk Drive (HDD) and the like may be used for the auxiliary storage device 13. The auxiliary storage device 13 stores the program and the data to perform various processes. A part of the program stored in the main storage apparatus 12 is loaded into the main storage device 12. By executing the program by the CPU 11, various processes are realized. A storage part 130 includes the main storage device 12 and/or the auxiliary storage device 13.

The input device 14 includes a mouse, keyboard, and the like, and is used by a user to input various information items for the processes of the data collection apparatus 100. The display device 15 displays the various information items under control of the CPU 11. The communication I/F 17 performs communications such as wired communications, wireless communications, and the like via a network. The communications by the communication I/F 17 are not limited to the wired or wireless communications.

The program realizing the processes of the data collection apparatus 100 may be provided to the data collection apparatus 100 by a recording medium 19 such as a Compact Disc Read-Only Memory (CD-ROM) or the like.

The drive device 18 interfaces between the recording medium 19 set in the drive device 18 and the data collection apparatus 100. The recording medium 19 may be the CD-ROM or the like.

Also, the program realizing various processes according to the embodiment is stored in the recording medium 19. The program stored in the recording medium 19 is installed into the data collection apparatus 100 through the drive device 18. The installed program becomes executable in the data collection apparatus 100.

A medium to store the program is not limited to the CD-ROM and may be a computer-readable storage medium. Other than the CD-ROM, the computer-readable storage medium may be a Digital Versatile Disk (DVD), a portable recording medium such as a Universal Serial Bus (USB) memory, or a semiconductor memory such as a flash memory.

In order to use the blogs 3a for the market research, first, the parent population is adequately created by sampling the users. That is, the parent population is created so that the attribute ratio of the users in the parent population is equivalent to an attribute ratio indicated by data such as a national population distribution or the like. The national population distribution, in which a gender and an occupation are attributes, may be referred to, and a number of samples is determined so that the ratio for each of the attributes is equivalent to that in the national population distribution. In the following, a distribution by the number of samples, which is referred to when the parent population is created, is called a "reference distribution".

FIG. 3 is a diagram illustrating an example of the reference distribution. In FIG. 3, a reference distribution 1 is presented by a table indicating the number of samples in a matrix in which the gender and the occupation are attributes. An attribute value of the gender is "MALE" or "FEMALE". The attribute values of the occupation are "JUNIOR HIGH AND HIGH SCHOOL STUDENTS", "COLLEGE STUDENT", "EMPLOYED PERSON", "HOUSEWIFE", "SENIOR", "OTHERS", and the like. In the reference distribution 1, a gender ratio, an occupation ratio, and the like approximately correspond to those in the national population distribution. Based on the reference distribution 1, the parent population is created.

In the embodiment, based on the reference distribution 1, the parent population is created with the same ratios of the attribute values as those in the national population distribution. If a user appears to be excluded from the parent population with time, another user, who likely has the same attribute value as the user to be excluded, is searched for, and the parent population is replenished with new users.

The attribute of the user is changed, when the user who was a high school student has become a college student. Also, the user may stop updating the blog 3a. The attribute values of the users may be estimated by applying a model with respect to the blog articles posted by the users. Such a model may be created by an application of a document classification technology.

The model classifies the users based on words written in the blog articles and a frequency for each of the words. By using this mode, in a case in which a word "club activity" is written, a possibility of the junior high and high school students is increased. In this method, multiple blog articles are collected for each of the users.

If the user is replaced without consideration in order to successively monitor an actual life condition of people, a different pattern may appear. In this case, it may be erroneously detected as though the actual life condition of people is suddenly changed. In order to accurately research a life condition of people, a target user to replenish the parent population is preferably the same as the user who posted in a similar behavior to the user excluded from the parent population.

A random sampling may be applied as a method of selecting the user. The random sampling may be performed in the following procedure:
1. Acquire an appearance frequency distribution $P_{all}$ of words in a user set for each of attribute values before changing a sampling.
2. Collect contribution contents related to a new user who is randomly selected.
3. Acquire an appearance distribution $P_u$ of the words posted by the user and an attribute estimate value.
4. Apply the user posting the words as the new user if a similarity between the appearance frequency distribution $P_{all}$ and the appearance distribution $P_u$ is greater than or equal to a threshold and the attribute estimate value corresponds to an insufficient cell.
5. Repeat the above items 2 to 4, and terminate when the parent population is replenished with the new users by a number of insufficient users.

In this procedure, the randomly selected users are applied at a low possibility. Hence, a number of collections is increased, and the new users are not sufficiently acquired due to a collection count restricted by the blog servers 3. That is, it may be difficult to collect the new users currently having a specific attribute value (which may be the junior high and high school students) to replenish the users of the parent population in the random sampling. The random sampling may be ineffective to an appropriate replenishment.

In the data collection apparatus 100 according to the embodiment, instead of randomly selecting the users as collection targets, replenishment targets are users alone who posted once or more the blog articles including characteristic words of the user to be replenished.

In a case of randomly setting keywords, users, who post the blog article related to specific topics alone, are collected. As a result, a life condition of people may not be reflected to the parent population.

Accordingly, in the embodiment, the keywords are determined to prevent a bias in which a trend of the posting contents of collection target users is biased with time. The keywords may be determined to satisfy the following items (1) and (2):

(1) Add, as the keywords, significant words easily classified into the attribute value (which may be the junior high and high school students) desired to acquire from a top in sequence in an estimate model. In the estimate model, the attribute is estimated for each of the users in the reference distribution 1.

By applying the item (1), an estimate result related to the users likely corresponds to a desired attribute value.

(2) The bias of the trend of the posting contents is defined by a distribution of an attribute value other than the gender, the occupation, or the like in the reference distribution 1, and the keywords are set so that a difference between before and after a sampling review is smaller. Hereinafter, an attribute having such values is called "unadjusted attribute" since the number of the samples is unadjusted.

A adjusted attribute corresponds to a research target of the gender, the occupation, or the like. The unadjusted attribute is not the research targets. A hobby attribute or the like may be considered as the unadjusted attribute. As the attribute values related to the hobbies, there are more than 50 attribute values such as a gourmet, a movie, and the like. The values of the hobby attribute are more than those of other demographic attribute values. Hence, it is difficult to adjust the number of the attribute values.

The hobby attribute is useful in a system, which extracts information for the actual life condition of people. Instead, in a subject system, a similar solution may be achieved by using another attribute. In a case of a disaster-related research, the other attribute may be a living area having values such as Tokyo, Osaka, and the like.

It has been found by a pilot study that it is possible to extract the information of the users whose trends of the posting contents are similar to each other by empirically focusing on the hobby attribute values. By using the hobby attribute values as the keywords, it seems possible to search for the new users having the adjusted attribute values from the blog servers 3. The hobby attribute values are applied as the unadjusted attribute values, and the embodiment will be described.

There may be duplicate values of the hobby attribute, which appear among the users in multiple adjusted attribute values. In a case of using the values of the hobby attribute respective to the multiple adjusted attribute values, with respect to the adjusted attribute for which the user information is replenished, a new user may not be precisely searched for. In the following, the values of the hobby attribute values are called keywords, and the values of the hobby attribute corresponding to the multiple adjusted attribute values are called duplicate keywords.

The inventors researched a difference of an appearance trend between two adjusted attribute values related to the duplicate keywords. The inventors count a total number of the blog articles in which the duplicate keywords empirically known by the inventors appear, for each of the users with respect to each of the adjusted attribute values, and study a distribution of the number of the users for every number of the blog articles. In the following, a research result acquired by using two duplicate keywords will be described with reference to FIG. 4 and FIG. 5. In FIG. 4 and FIG. 5, the two duplicate keywords are represented by "XXX" and "YYY".

FIG. 4 is a diagram illustrating an example of the research result. The research result 1a depicted in FIG. 4 indicates an appearance trend related to the duplicate keyword "XXX" commonly appeared for the adjusted attribute values "FEMALE JUNIOR AND SENIOR HIGH SCHOOL STUDENTS" and "HOUSEWIFE".

In the research result 1a, the number of the users and the ratio for each of the adjusted attribute values are indicated for every number of the blog articles. In a case of one blog article where the duplicate keyword "XXX" appears, a number of the female junior and senior high school students is "1920", and the number of housewives is "1685". Accordingly, in a case in which the number of the blog articles indicates "1", the ratio of the female junior and senior high school students is "0.533" (=1920÷(1920+1685)). In the case of one blog article, the number of the female junior and senior high school students seems to be the same as that of the housewives.

However, in a case in which the number of the blog articles is greater than or equal to "6", the ratio of the female junior and senior high school students is approximately "0.8". Accordingly, if the number of the blog articles of the same user, in which the duplicate keyword "XXX" appears, indicates greater than or equal to "6", the user may be determined as the female junior or senior high school student.

Each of the ratios of the female junior and senior high school students from "6" blog articles to "12" blog articles uniformly exceeds "0.8". In this range, it is determined that the users being the female junior or senior high school students are specified at higher accuracy.

FIG. 5 is a diagram illustrating another example of the research result. The research result 1b depicted in FIG. 5 indicates an appearance trend related to the duplicate keyword "YYY" commonly appearing for the adjusted attribute values "MALE, MARRIED AND SENIOR" and "FEMALE, MARRIED AND SENIOR".

In the research result 1b, the number of the users and the ratio for each of the adjusted attribute values are indicated for every number of the blog articles. In a case of one blog article where the duplicate keyword "YYY" appears, the number of the male, married and seniors is "3396", and the number of the female, married and seniors is "1685". Accordingly, in a case in which the number of the blog articles indicates "1", the ratio of the male, married and seniors is "0.593" (=3396÷(3396+2331)). In a case of one blog article, the number of the male, married and seniors seems to be the same as that of the female, married and seniors.

However, the ratio of the male, married and seniors indicates approximately "0.8" in a case in which the number of the blog articles indicates "11" or more. Moreover, the ratio of the male, married and seniors indicates approximately "1.0" in a case in which the number of the blog articles indicates "17" or more. Accordingly, for the blog articles of the same user, if the duplicate keyword "YYY" appears in "11" or more blog articles, the user is determined as the male, married and seniors.

As described above, the inventors researched the duplicate keywords with respect to the blogs 3a among the users for two or more different adjusted attribute values, and found out that the appearance trend of the duplicate keyword is different for each of the adjusted attribute values. The embodiment provides the data collection apparatus 100 capable of using the duplicate keywords for a collection of the blogs 3a of the users for each of the adjusted attribute values.

Figure 6:
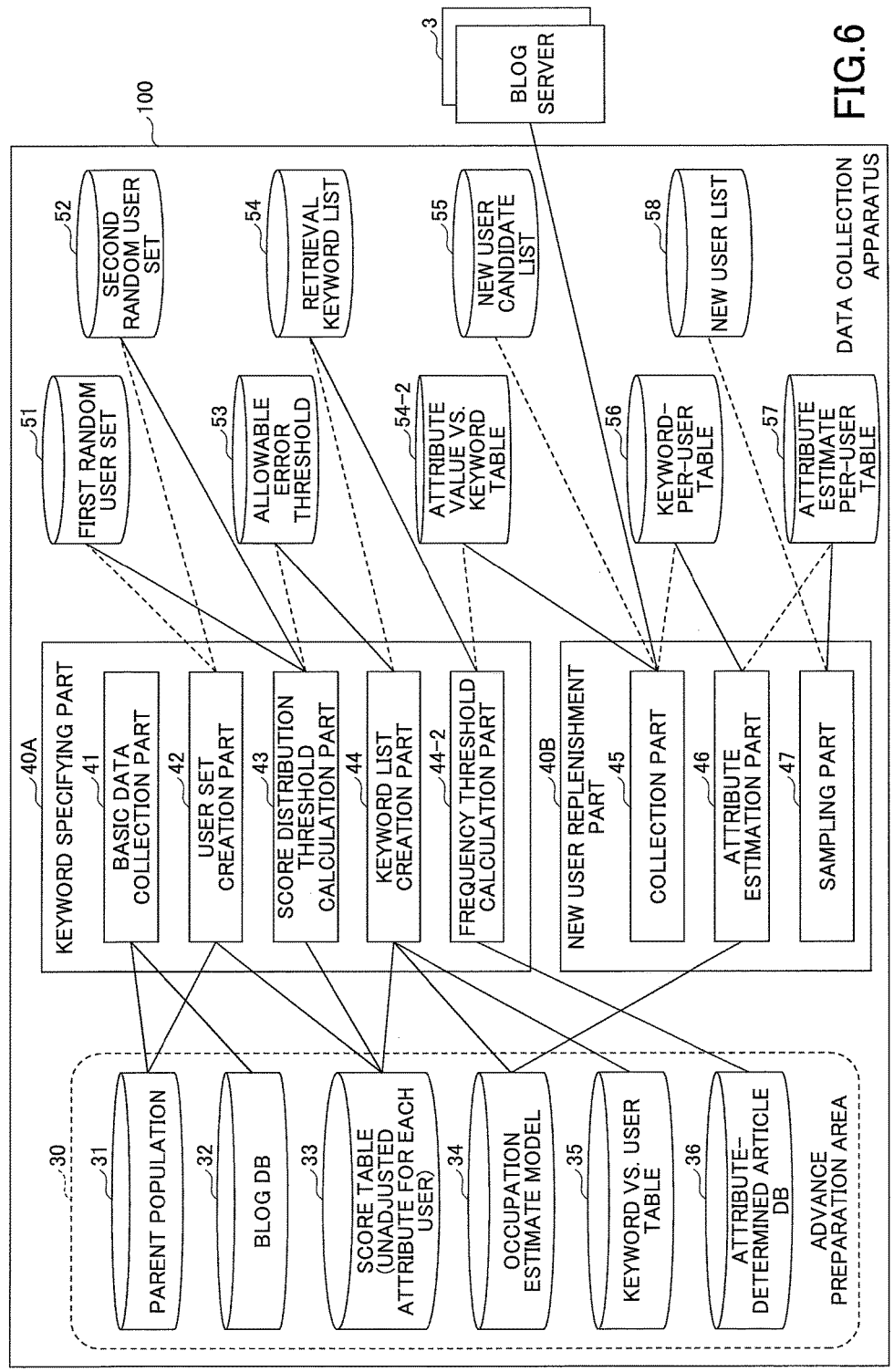
FIG. 6 is a diagram illustrating a functional configuration example of the data collection apparatus.

FIG. 6 is a diagram illustrating a functional configuration example of the data collection apparatus. In FIG. 6, a solid line indicates an input, and a dashed line indicates an output. The solid line and the dashed line are applied in the same manner in the following figures.

Referring to FIG. 6, the data collection apparatus 100 mainly includes a keyword specifying part 40A, and a new user replenishment part 40B. The keyword specifying part 40A and the new user replenishment part 40B are realized by processes which the CPU 11 is caused by corresponding programs to perform in the data collection apparatus 100. The keyword specifying part 40A and the new user replenishment part 40B may be implemented in one data collection apparatus 100, or separately implemented by multiple computer apparatuses.

An advance preparation area 30 in the storage part 130 stores a parent population 31, a blog DB 32, a score table 33, an occupation estimate model 34, a keyword vs. user table 35, an attribute-determined article DataBase (DB)s 36, and the like. Moreover, the storage part 130 stores a first random user set 51, a second random user set 52, an allowable error threshold 53, a retrieval keyword list 54, an attribute value vs. keyword table 54-2, a new user candidate list 55, a keyword-per-user table 56, an attribute estimate per-user table 57, a new user list 58, and the like.

The keyword specifying part 40A specifies the keywords used to search for the adjusted attribute of the user who is a target to replenish the parent population 31. The keyword specifying part 40A includes a basic data collection part 41, a user set creation part 42, a score distribution threshold calculation part 43, a keyword list creation part 44, and a frequency threshold calculation part 44-2.

The basic data collection part 41 creates the parent population 31 by searching for the user from the blog servers 3 based on the ratio of each of the attribute values in accordance with the reference distribution 1. The basic data collection part 41 acquires the blogs 3a for each of the users included in the parent population 31 from the blog servers 3, and stores the acquired blogs 3a.

The user set creation part 42 randomly creates two user sets from the parent population 31 acquired from the basic data collection part 41. A user ID is recorded to a first random user set 51 or a second random user set 52 for each of the users belonging to the two sets.

The score distribution threshold calculation part 43 calculates a score distribution for each value of the hobby attribute with respect to two user sets created by the user set creation part 42, and acquires the allowable error threshold 53 by comparing two score distributions with each other. The score table 33 is referred to when the score distribution is calculated.

The keyword list creation part 44 sets the keywords to improve likelihood of the attribute to which the user belongs, and creates a list of the keywords in which the score distribution of the values of the hobby attribute falls in the allowable error threshold 53.

The likelihood of belonging to a certain attribute may be expressed as 'junior high and high school students likeness' or the like. By setting multiple keywords, it is possible to improve the likelihood of belonging to the certain attribute. The likelihood of belonging to the certain attribute is determined by referring to the occupation estimate model 34. The keyword vs. user table 35 is referred to, when the score distribution of the values of the hobby attribute is calculated. The likelihood of belonging to the certain attribute is simply called "attribute likeness".

The keyword list creation part 44 creates the retrieval keyword list 54 indicating the keywords to search for blog article contents of the blogs 3a. The retrieval keyword list 54 indicates the keywords with their scores indicating the attribute likeness for each of the attribute values.

The frequency threshold calculation part 44-2 refers to the retrieval keyword list 54, acquires a frequency for each of the keywords to be written in the blog articles for each of the attribute values, and determines effectiveness in a case of using the keyword (the duplicate keyword) appearing with respect to multiple attribute values.

The attribute value vs. keyword table 54-2 is created to indicate the keywords and the frequency for each of the keywords being written in the blog articles for each of the attribute values. Based on a determination result of the effectiveness by the frequency threshold calculation part 44-2, with respect to each of the duplicate keywords, the attribute value vs. keyword table 54-2 indicates one of the multiple attribute values for which the duplicate keyword appears. With respect to one or more other attribute values to which the effectiveness is not determined, the frequency is not set. That is, if the users of these other attribute values are searched for, it is suppressed to use the keyword of which the frequency has not been set.

The new user replenishment part 40B replenishes the parent population 31 with the new user by using the keyword specified by the keyword specifying part 40A, and includes a collection part 45, an attribute estimation part 46, and a sampling part 47.

The collection part 45 collects the blogs 3a by searching for the blog articles of the blogs 3a posted by the users having the same attribute as insufficient users (excluded from the parent population 31), in accordance with a rule of the attribute value vs. keyword table 54-2. The collection part 45 specifies the users of the collected blogs 3a as candidate users, and stores the new user candidate list 55 indicating user IDs in the storage part 130.

Also, the collection part 45 counts the blog articles in which the keywords in the attribute value vs. keyword table 54-2 appear, for each of the candidate users. The keyword-per-user table 56, which records the frequency of each of the keywords used for the search for each of the candidate users, is stored in the storage part 130.

The attribute estimation part 46 applies the occupation estimate model 34 to the blog articles of the collected blogs 3a. The attribute estimate per-user table 57 indicating an attribute estimate for each of the users is stored in the storage part 130.

In a case in which the collection part 45 collects the blog articles to replenish the parent population 31, it is preferable to collect the blogs 3a in descending order of scores indicating the attribute likeness by using the retrieval keyword list 54. On the other hand, even in a case of a high score, when the keyword belongs to multiple attribute values, the blogs 3a of target users may not be appropriately collected.

As one example, a keyword "class" is regarded as an significant word to express the attribute likeness with respect to a junior high school student, a college student, or the like. In a case in which the adjusted attribute indicates the "junior high and high school students", if the blogs 3a are collected by using the keyword "class", the blogs 3a related to the college student and the like may be retrieved together with the blogs 3a related to "junior high and high school students".

If a large number of the blogs 3a pertinent to attribute values other than the adjusted attribute values are collected, user information may not be acquired for a desired number of the users of a target adjusted attribute. In this case, the collection may be performed many times. Hence, the collection is not effectively performed. In a case in which the collection is ineffectively performed, due to a collection count restriction, sufficient sets of user information may not be acquired as a result.

Also, until collecting the number of the users for replenishment, the keyword is changed in descending order of the scores of the attribute likeness. However, when the score becomes lower, the keyword may not be suitable to express the attribute likeness. As a result, the collection may be ineffectively performed.

In consideration of the above described ineffective collection, a simple method may be suppressing using the keywords belonging to the multiple attribute values. In this method, disadvantageously, a number of significant words expressing the attribute likeness is reduced.

In the embodiment, the frequency threshold calculation part 44-2 determines effectiveness for each of the words in order to replenish the parent population. Even if the keyword is overlapped between the adjusted attribute and another attribute, by using a frequency threshold as a condition, the user information may be effectively and precisely acquired by the number of users desired for the target adjusted attribute.

Figure 7:
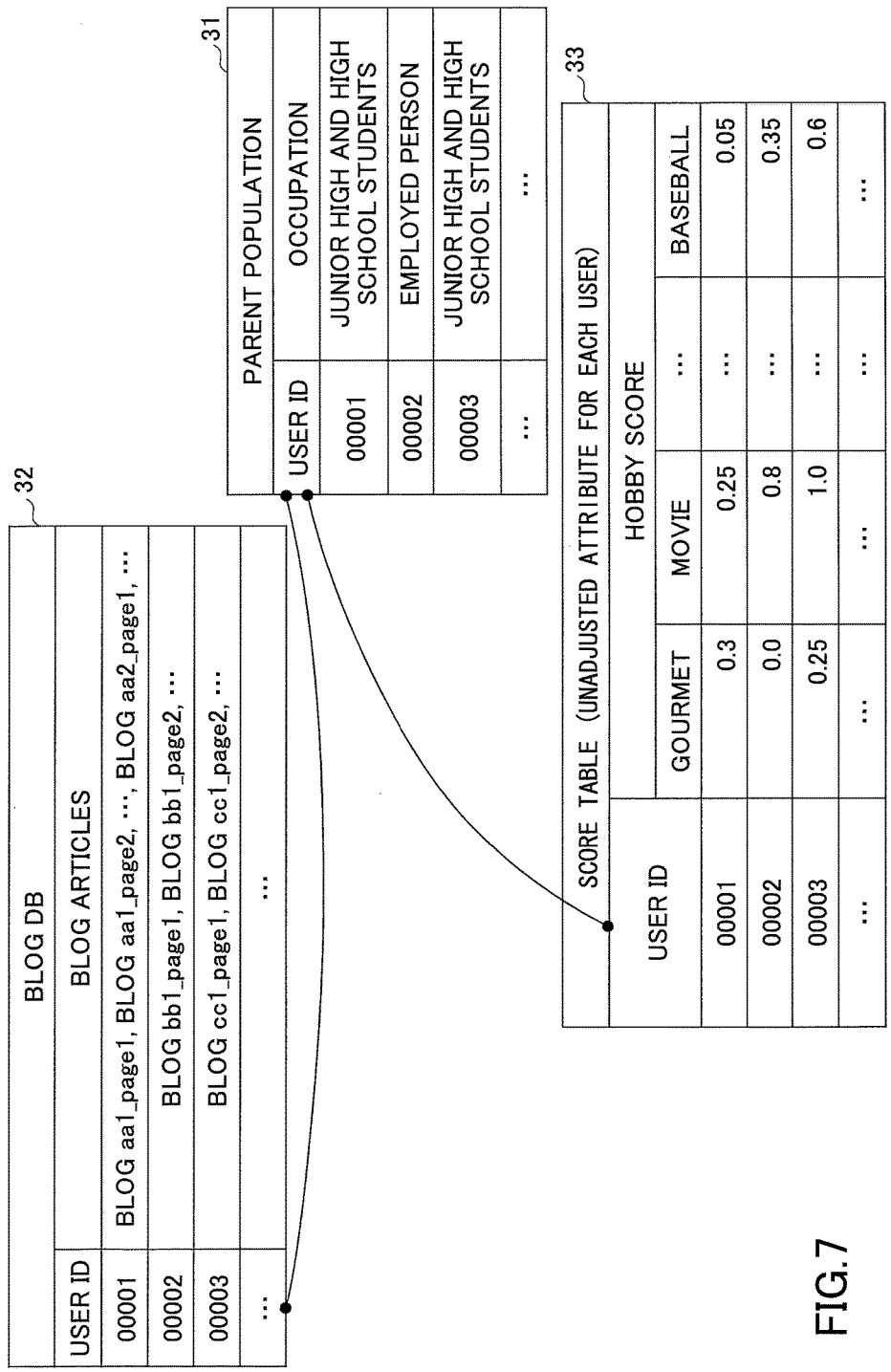
FIG. 7 is a diagram illustrating data configuration examples pertinent to users in a parent population.

Next, tables and the like stored in the storage part 130 will be described. FIG. 7 to FIG. 10 are diagrams illustrating data examples of prepared databases and tables in the embodiment. In FIG. 7, data configuration examples pertinent to the users in the parent population 31 will be illustrated.

The parent population 31 is regarded as a table, which indicates an occupation for each of the user IDs. The user ID is given based on the user information to specify the user in the parent population 31, and also is used in the same manner in other databases and tables, which will be described later. The occupation indicates a user's occupation, which is estimated from the blog articles of the blogs 3a. The attribute values of the occupation are the same as those of the occupation in the reference distribution 1 illustrated in FIG. 3.

The blog DB 32 corresponds to a table, which indicates the blog articles (article data) of the blogs 3a for each of the user IDs. For each of the blog articles, a page of the blogs 3a acquired from the blog server 3 is stored, or an address pointing to a storage area of the blog 3a is indicated.

It is preferable that the blog articles maintained in the blog DB 32 are stored by a page unit of the blog 3a. Depending on the user, multiple blogs 3a are maintained. In this case, extracted pages are recorded for each of the blogs 3a.

The score table 33 indicates hobby scores for each of user IDs. The values of the hobby attribute may be "GOURMET", "MOVIE", . . . , "BASEBALL", and the like. In the score table 33, the hobby scores are indicated respectively for the values of the hobby attribute for each of users. The closer the hobby score is to 1, the more the hobby is interesting. The closer the hobby score to 0, the less the hobby is interesting.

For example, it is apparent from the hobby score "1.0" of the "movie" that the user of the user ID "00003" is interested in the movie. Also, it is apparent from the hobby score "0.0" of the "gourmet" that the user of the user ID "00002" is not interested in the gourmet at all.

FIG. 8 is a diagram illustrating a data configuration example of the occupation estimate model 34. In FIG. 8, the occupation estimate model 34 indicates occupation scores for each of the keywords. The values of the occupation scores correspond to the attribute values of the reference distribution 1, and are "junior high and high school students", . . . , and "others". The occupation scores are indicated respectively to the values of the occupation attribute. The closer the occupation score is to 1, the more the keyword is relevant to the value of the occupation attribute. The closer the occupation score is to 0, the more the keyword is irrelevant to the value of the occupation attribute. The closer the occupation score is to −1, the more the keyword is likely to be relevant to other values of the occupation attribute since a relevance possibility between the keyword and the value of the occupation attribute is less.

If the keyword "club activity" appears in the blog article, based on the occupation score, the likelihood for the user, who is the blogger of the blog 3a, to be the junior high or high school student is increased by "0.5" points. In addition, the likelihood of other occupations is increased by "0.01" points.

FIG. 9 is a diagram illustrating a data configuration example of the keyword vs. user table. In FIG. 9, the keyword vs. user table 35 indicates a list of the user IDs corresponding to each of the keywords. In a column "KEYWORD", the multiple keywords used for the search are listed. The user IDs are indicated with respect to the blogs 3a where the keyword appears, for each of the keywords. The user IDs "00002", "00383", and the like correspond to the keyword "CLUB ACTIVITY".

FIG. 10 is a diagram illustrating a data configuration example of the attribute-determined article DB. In FIG. 10, the attribute-determined article DB 36 maintains the blog articles for each of the users whose attribute values have been determined. For each of the user IDs, the occupation and the blog articles are made to correspond to. The attribute-determined article DB 36 is associated with the parent population 31 and the blog DB 32 by the user ID, and is created beforehand by acquiring and using data from the parent population 31 and the blog DB 32.

From data examples in FIG. 7, the occupation "JUNIOR HIGH AND HIGH SCHOOL STUDENTS" is made to correspond to the user ID "00001" by acquiring from the parent population 31, and the blog articles "BLOG aa1_page1, BLOG aa1_page2, . . . , BLOG aa2_page1, . . . " are made to correspond to the user ID "00001" by acquiring from the blog DB 32.

The occupation "EMPLOYED PERSON" is made to correspond to the user ID "00002" by acquiring from the parent population 31. The blog articles "BLOG bb1_page1, BLOG bb1_page1, . . . " are made to correspond to the user ID "00002" by acquiring from the blog DB 32. Moreover, the occupation "JUNIOR HIGH AND HIGH SCHOOL STUDENTS" is made to correspond to the user ID "00003" by acquiring from the parent population 31. The blog articles "BLOG cc1_page1, BLOG cc1_page1, . . . " are made to correspond to the user ID "00003" by acquiring from the blog DB 32.

Figure 11:
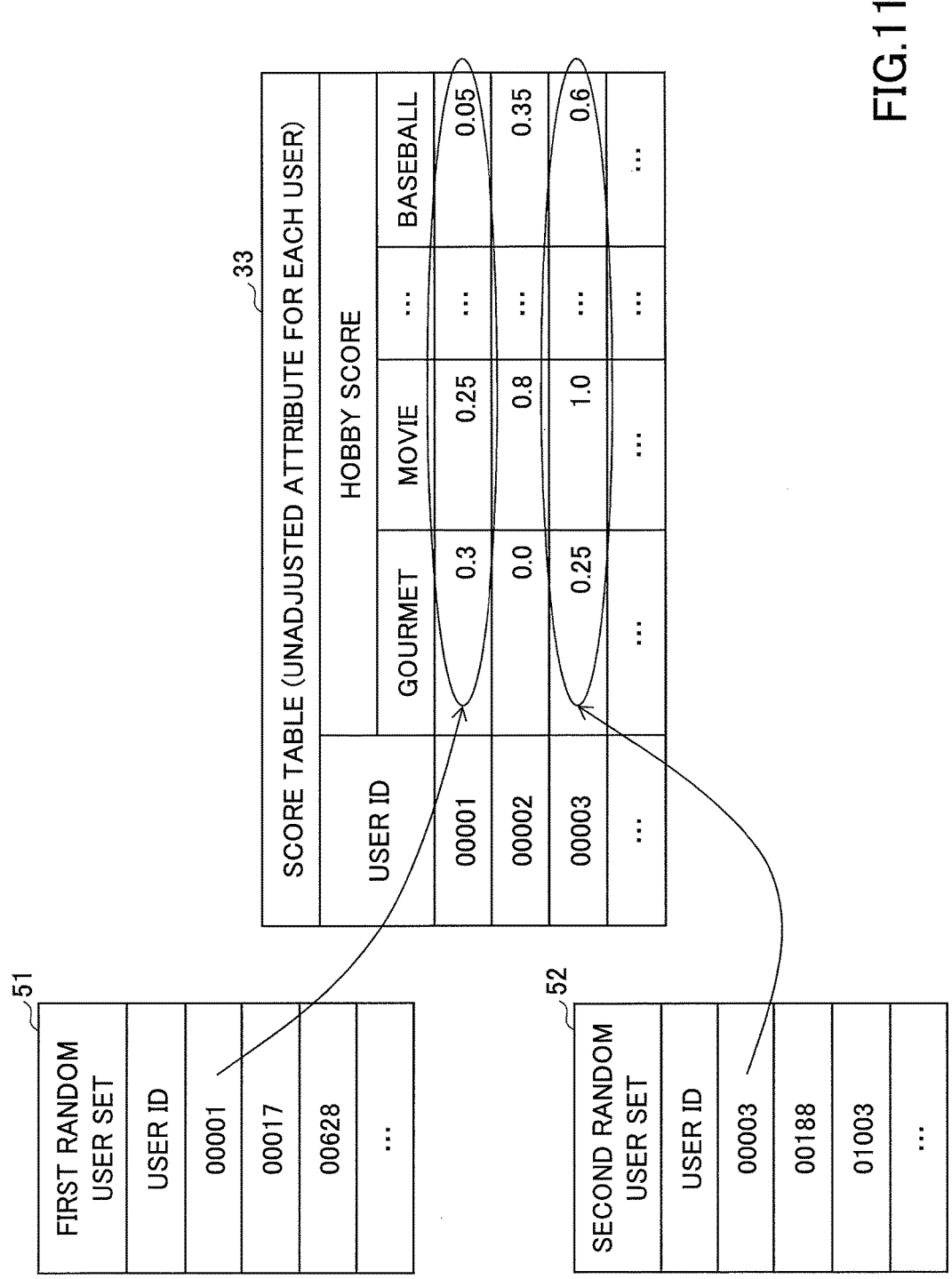
FIG. 11 is a diagram illustrating a data example of the user set randomly selected from the parent population.

FIG. 11 is a diagram illustrating a data example of the user set randomly selected from the parent population. In FIG. 11, in each of the first random user set 51 and the second random user set 52 created by the user set creation part 42, the user IDs randomly selected from the parent population 31 are recorded.

Each of the first random user set 51 and the second random user set 52 is associated, by the user ID, with the score table 33 related to the unadjusted attribute values for each of the users. The hobby scores (the score distribution) corresponding to the user ID for the values of the hobby attribute is acquired from the score table 33.

The first random user set 51 and the second random user set 52 are used by the score distribution threshold calculation part 43 in order to calculate the allowable error threshold 53.

FIG. 12 is a diagram illustrating a data configuration example of the retrieval keyword list. In FIG. 12, the retrieval keyword list 54 indicates one or more keywords corresponding to the respective attribute values.

In the data configuration example in FIG. 12, "CLUB ACTIVITY", "LESSON", "SCHOOL", and "PART TIME" are listed as characteristic keywords with respect to the attribute value "JUNIOR HIGH AND HIGH SCHOOL STUDENTS". Also, "COLLEGE", "COLLEGE CLUB", "LESSON", and "BOX LUNCH" are listed as the characteristic keywords with respect to the attribute value "COLLEGE STUDENT". Moreover, "work place", "box lunch", "commuting", and "business trip" are listed as characteristic keywords with respect to the attribute value "EMPLOYED PERSON". Furthermore, "HUSBAND", "KINDERGARTEN", "BOX LUNCH", AND "SUPPER" are listed as characteristic keywords with respect to the attribute value "HOUSEWIFE".

The keyword "LESSON" overlaps the attribute values "JUNIOR HIGH AND HIGH SCHOOL STUDENTS" and "COLLEGE STUDENT". Also, the keyword "BOX LUNCH" overlaps the attribute values "COLLEGE STUDENT", EMPLOYED PERSON", and "HOUSEWIFE".

FIG. 13 is a diagram illustrating a data configuration example of the attribute value vs. keyword table. In FIG. 13, the attribute value vs. keyword table 54-2 is regarded as a table in which an item of a rule is added to items of the retrieval keyword list 54.

The rule is represented by an extraction condition indicating the frequency of the keyword (corresponding to the number of the blog articles). In the data configuration example depicted in FIG. 13, the extraction condition "≥1" (greater than or equal to 1) is set for not-overlapped words. For the duplicate keywords, there are one case in which the rule is set by the attribute value and another case of a blank.

With respect to the duplicate keyword "LESSON", the extraction condition "≥7" (greater than or equal to 7) is set as the rule for the attribute value "JUNIOR HIGH AND HIGH SCHOOL STUDENTS". On the other hand, the blank is set for the attribute value "COLLEGE STUDENT". That is, if "COLLEGE STUDENT" is the adjusted attribute, "LESSON" is the characteristic keyword in the blog article contents of the blogs 3a maintained by the college students, but is not used as the keyword to extract the user information of the user.

With respect to the duplicate keyword "BOX LUNCH", an extraction condition "≥3" (greater than or equal to 3) is set as the rule for the attribute value "HOUSEWIFE". On the other hand, the blank is set for the attribute values "COLLEGE STUDENT" and "EMPLOYED PERSON". That is, if "COLLEGE STUDENT" or "EMPLOYED PERSON" is the adjusted attribute, "BOX LUNCH" is the characteristic keyword in the blog article contents of the blogs 3a maintained by the college students or the employed persons, but is not used as the keyword to extract the user information of the users.

FIG. 14 is a diagram illustrating a data configuration example of the new user candidate list. In FIG. 14, the new user candidate list 55 indicates IDs of the users maintaining the blogs 3a collected by the collection part 45.

FIG. 15 is a diagram illustrating a data configuration example of the keyword-per-user table. In FIG. 15, the keyword-per-user table 56 indicates the keywords appearing in the blog articles, with the frequency for each of the users IDs included in the new user candidate list 55, and includes items of "USER ID", "KEYWORD", and the like.

A result from collecting latest ten blog articles of the user is indicated in the item "KEYWORD". Also, each of the keywords appearing in the latest ten blog articles is indicated with a number of the blog articles where the keyword appears.

With respect to the user ID "00002", "CLUB ACTIVITY×3, LESSON×8, FRIEND×2, GAME×5, . . ." is indicated in the item "KEYWORD". The keyword "CLUB ACTIVITY" appears in three blog articles, the keyword "LESSON" appears in two blog articles, the keyword "FRIEND" appears in two blog articles, the keyword "GAME" appears in five blog articles, and the like are recorded.

FIG. 16 is a diagram illustrating a data configuration example of the attribute estimate per-user table. In FIG. 16, the attribute estimate per-user table 57 indicates estimates and an estimated attribute for each of the user IDs included in the new user candidate list 55.

The estimates calculated by the attribute estimation part 46 is indicated. The estimates indicate respective likelihoods with respect to the values of the occupation attribute, which are the same as "JUNIOR HIGH AND HIGH SCHOOL STUDENTS", . . . , "OTHERS" of the reference distribution 1 in FIG. 3. The higher the estimate is, the more the occupation is suitable. The lower the estimate is, the less the occupation is suitable. The estimated attribute indicates a value being a highest in the estimates respective to the values of occupation attribute as the occupation attribute.

FIG. 17 is a diagram illustrating a data example of the new user list. In FIG. 17, the new user list 58 is regarded as a list created for the value of the occupation attribute in which the number of the users is insufficient. The user IDs of the new users to replenish to the parent population 31 are listed in the new user list 58.

With respect to the value "JUNIOR HIGH AND HIGH SCHOOL STUDENTS", "COLLEGE STUDENT" of the occupation attribute, the user IDs "00002", "00383", and "00876" representing the new users replenish to the parent population 31.

Next, a new user replenishment process according to the embodiment will be described. FIG. 18 to FIG. 21 are flowcharts for explaining the new user replenishment process. In FIG. 18 to FIG. 21, as an example, a case, in which the value "JUNIOR HIGH AND HIGH SCHOOL STUDENTS" of the occupation attribute is an insufficient attribute value, will be described. The same manner is applied for other values of the occupation attribute.

Figure 18:
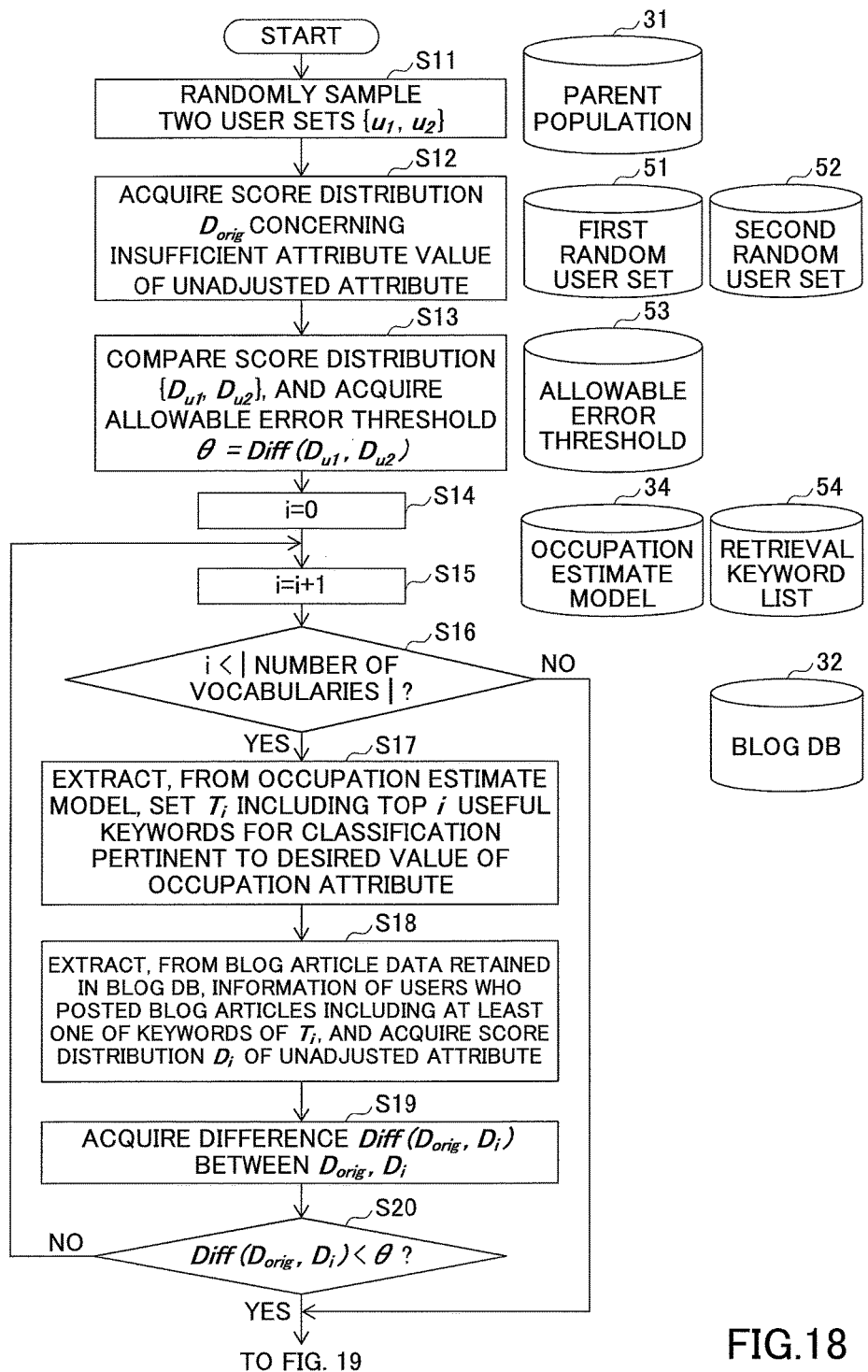
FIG. 18 is a flowchart for explaining a new user replenishment process (part 1)

In FIG. 18, the user set creation part 42 creates two random user sets $u_1$ and $u_2$ based on the score table 33 regarding the unadjusted attribute for each of users (step S11). The random user sets $u_1$ and $u_2$ include the user IDs, which are randomly extracted from the user IDs associated with the "JUNIOR HIGH AND HIGH SCHOOL STUDENTS" as the occupation by referring to the parent population 31. The user IDs in the random user set $u_1$ form the first random user set 51, and the user IDs in the random user set $u_2$ form the second random user set 52.

Next, the score distribution threshold calculation part 43 calculates a score distribution $D_{orig}$ concerning the insufficient attribute value of the unadjusted attribute (step S12). The score distribution $D_{orig}$ may be calculated by an expression 1 and an expression 2.

$$D_{orig} = \{d_{orig,h1}, d_{orig,h2}, \ldots, d_{orig,hm}\} \quad \text{[Expression 1]}$$

In the expression 1, $h_1$ to $h_m$ correspond to the values "GOURMET", "MOVIE", . . . , "BASEBALL", and the like.

$$d_{orig,h} = \{r_{orig,h*s1}, r_{orig,h*s1}, \ldots, r_{orig,h*sn}\} \quad \text{[Expression 2]}$$

($r_{orig,h*s}$:RATIO OF USERS HAVING SCORE s FOR HOBBY h)

Also, the score distribution threshold calculation part 43 compares unadjusted attribute score distributions $Du_1$ and $Du_2$, and acquires an allowable error threshold $\theta = Diff(Du_1, Du_2)$ (step S13). By applying the expression 1 and the expression 2 to each of the random user sets $u_1$ and $u_2$, the unadjusted attribute score distributions $Du_1$ and $Du_2$ are calculated. The allowable error threshold $\theta$ is defined based on a difference between the unadjusted attribute score distributions $Du_1$ and $Du_2$. The allowable error threshold $\theta$ corresponds to the allowable error threshold 53.

The score distribution threshold calculation part 43 calculates the score for each of hobbies h by a square-sum (expression 3) of differences among user number ratios $r_{u,h*s}$ for each of scores s.

$$\theta = \Sigma_{h \in hobbies} \Sigma_{s \in scores} (|r_{u1,h*s}| - |r_{u2,h*s}|)^2 \quad \text{[Expression 3]}$$

Figure 22A:
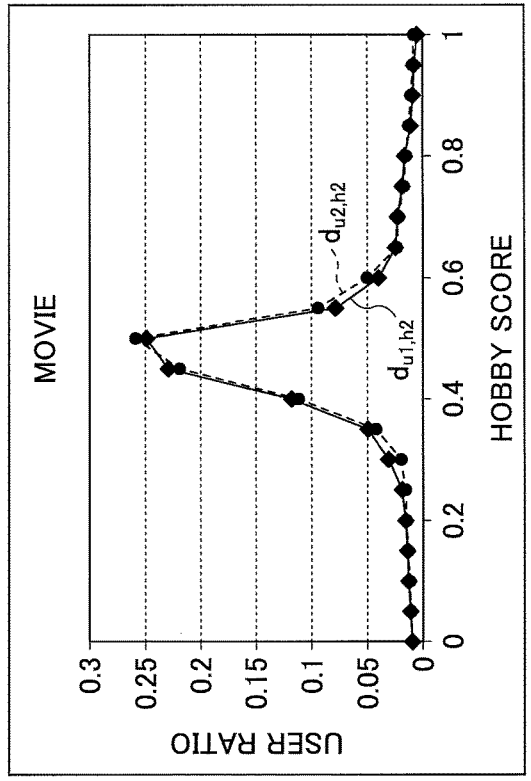
FIG. 22A is a graph illustrating unadjusted attribute score distributions regarding the value "GOURMET" for two random user sets.
Figure 22B:
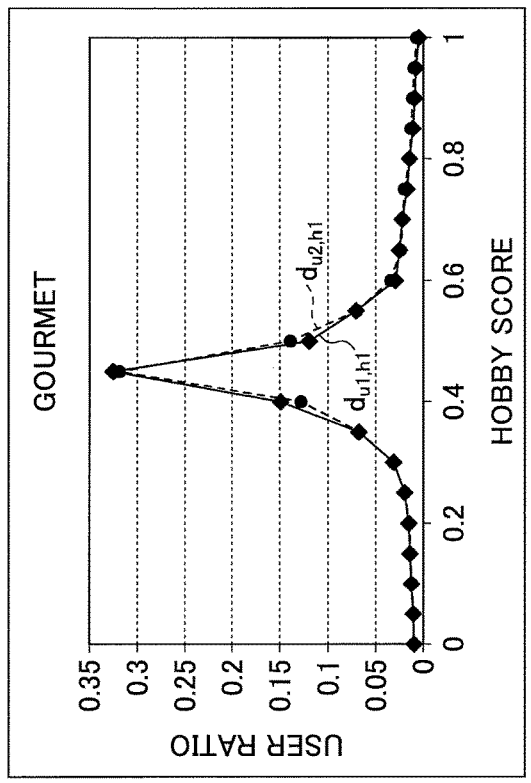
FIG. 22B is a graph illustrating the unadjusted attribute score distributions regarding the value "MOVIE" for the two random user sets.

In FIG. 22A and FIG. 22B, for each of the values "GOURMET" and "MOVIE" of the hobby attribute, a unadjusted attribute score distribution example of the random user sets $u_1$ and $u_2$ will be described in a case of the value "JUNIOR HIGH AND HIGH SCHOOL STUDENTS" of the occupation attribute. In FIG. 22A, a horizontal axis indicates an interest degree to the hobby by the hobby score, and a vertical axis indicates a user number ratio.

In FIG. 22A, regarding the value "GOURMET" (denoted by $h_1$) of the hobby attribute, $d_{u1,h1}$ denotes the unadjusted attribute score distribution of the random user set $u_1$, and $d_{u2,h1}$ denotes the unadjusted attribute score distribution of the random user set $u_2$.

In FIG. 22B, similarly, regarding the value "MOVIE" (denoted by $h_2$) of the hobby attribute, $d_{u1,h2}$ denotes the unadjusted attribute score distribution of the random user set $u_1$, and $d_{u2,h2}$ denotes the unadjusted attribute score distribution of the random user set $u_2$. Hence, by using the expression 3, the square-sum (expression 3) of differences is calculated for each of the values of the hobby attribute, and the allowable error threshold $\theta$ is acquired by a total of the square-sums for all values of the hobby attribute.

Referring back to FIG. 18, steps S14 to S20 correspond to a process conducted by the keyword list creation part 44. In processes from steps S14 to S20, the keywords are determined by the allowable error threshold $\theta$ so as to have the same distribution as the values of the occupation attribute being the unadjusted attribute in the parent population 31. First, the keyword list creation part 44 initializes a variable i to zero (step S14).

The keyword list creation part 44 increments the variable i by one (step S15), and determines whether the variable i is greater than or equal to a number of vocabularies (step S16). The number of the vocabularies may indicate a total number of the keywords "CLUB ACTIVITY", "TEST", and the like maintained in the occupation estimate model 34. When the variable i is greater than or equal to the number of the vocabularies, the process by the keyword list creation part 44 is terminated, and the new user replenishment process advances to step S31 in FIG. 19.

When the variable i is less than the number of the vocabularies, the keyword list creation part 44 extracts, from the occupation estimate model 34, a set Ti including top i useful keywords for a classification pertinent to a desired value of the occupation attribute (step S17). For instance, as the 'keywords useful to the classification pertinent to the desired value of the occupation attribute', a keyword capable of improving the 'junior high and high school students likeness' may be considered.

The keyword list creation part 44 extracts, from the blog articles retained in the blog DB 32, the user information of the users who posted the blog articles including at least one of the keywords in the set Ti, and acquires the score distribution Di of the unadjusted attribute (step S18).

In step S18, the keyword list creation part 44 extracts the user information of the users who posted the blog articles including at least one of the keywords in the set Ti by referring to the keyword vs. user table 35, and acquires the score distribution Di of the hobby attribute.

Next, the keyword list creation part 44 acquires a distribution difference $Diff(D_{orig}, Di)$ between the distribution $D_{orig}$ and the distribution Di of the insufficient value of the occupation attribute (step S19). The distribution difference $Diff(D_{orig}, Di)$ may be calculated by applying the expression 3 to the distribution $D_{orig}$ and distribution Di.

After that, the keyword list creation part 44 determines whether the distribution difference $Diff(D_{orig}, Di)$ acquired in step S19 is less than the allowable error threshold θ (step S20). When the distribution difference $Diff(D_{orig}, Di)$ is greater than or equal to the allowable error threshold θ, the keyword list creation part 44 determines that the distribution difference $Diff(D_{orig}, Di)$ has not reached the ratio of the desired value of the occasion attribute in the parent population 31, and goes back to step S15. The keyword list creation part 44 further adds an i-th keyword and repeats the above described processes in the same manner. On the other hand, when the distribution difference $Diff(D_{orig}, Di)$ is less than the allowable error threshold θ, the process by the keyword list creation part 44 is terminated, and the new user replenishment process advances to step S31 in FIG. 19.

Figure 23A:
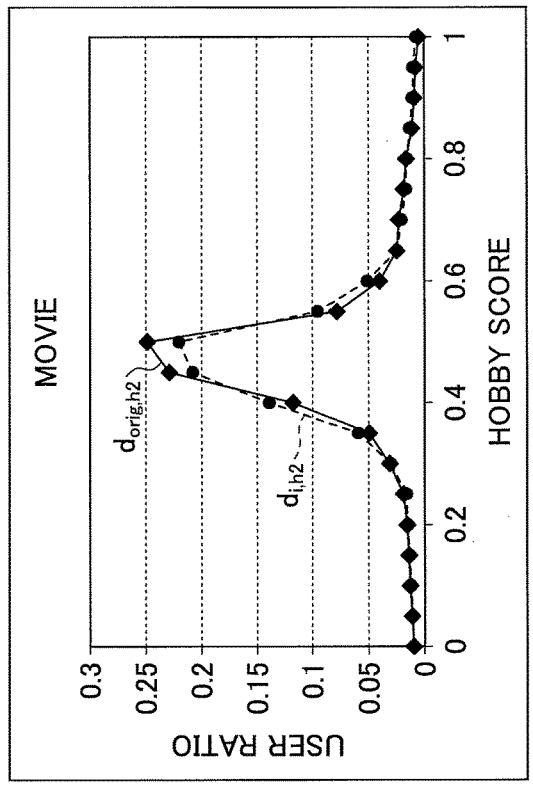
FIG. 23A is a graph illustrating unadjusted attribute score distributions regarding the value "GOURMET" for the parent population and insufficient users having a value of the occupation attribute.

Examples of the unadjusted attribute score distributions of the parent population 31 and the insufficient value "JUNIOR HIGH AND HIGH SCHOOL STUDENTS" of the occupation attribute will be described, regarding each of the values "GOURMET" and "MOVIE" of the hobby attribute. In FIG. 23A, the horizontal axis indicates the interest degree to the hobby by the hobby score, and the vertical axis indicates the user number ratio.

In FIG. 23A, regarding the value "GOURMET" (denoted by $h_1$) of the hobby attribute, $d_{orig,h1}$ denotes the unadjusted attribute score distribution of the parent population 31, and $d_{i,h1}$ denotes the unadjusted attribute score distribution of the insufficient value "JUNIOR HIGH AND HIGH SCHOOL STUDENTS" of the occupation attribute.

Figure 23B:
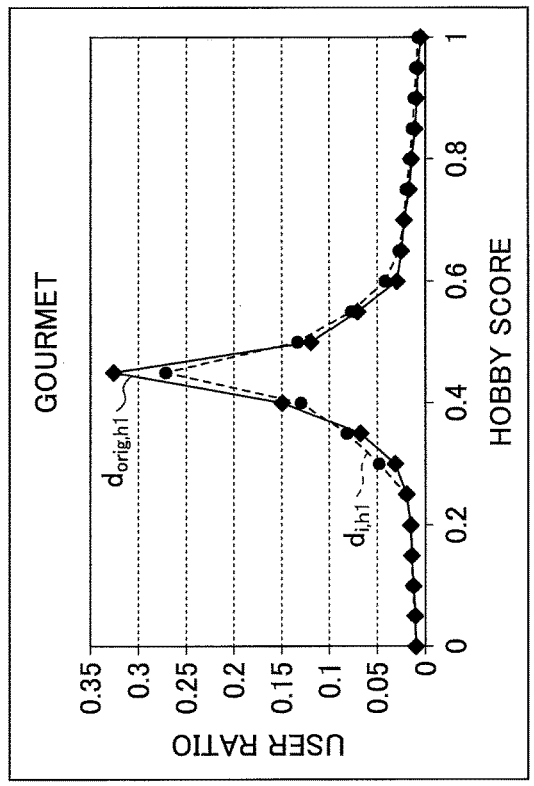
FIG. 23B is a graph illustrating unadjusted attribute score distributions regarding the value "MOVIE" for the parent population and the insufficient users having a value of the occupation attribute.

In FIG. 23B, similarly, regarding the value "MOVIE" (denoted by $h_2$) of the hobby attribute, $d_{orig,h2}$ denotes the unadjusted attribute score distribution of the parent population 31, and $d_{i,h2}$ denotes the unadjusted attribute score distribution of the unadjusted attribute score distribution of the insufficient value "JUNIOR HIGH AND HIGH SCHOOL STUDENTS" of the occupation attribute. Hence, by using the expression 3, the square-sum (expression 3) of differences is calculated for each of the values of the hobby attribute, and the distribution difference $Diff(D_{orig}, Di)$ is acquired by a total of the square-sums for all values of the hobby attribute.

The above described process is performed every time the keyword is added to the set Ti of retrieval keywords in descending order of the estimate of the value "JUNIOR HIGH AND HIGH SCHOOL STUDENTS" from the occupation estimate model 34 (FIG. 8). Based on the occupation estimate model 34 (FIG. 8), at a first time, the above described acquisition process of the distribution difference $Diff(D_{orig}, Di)$ is performed by the set Ti={club activity}. At a second time, the acquisition process is performed by the set Ti={club activity, test}. At a third time, the acquisition process is performed by the set Ti={club activity, test, class}. At a fourth time, the acquisition process is performed by the set Ti={club activity, test, class, school}.

At the fourth time, if the distribution difference $Diff(D_{orig}, Di)$ becomes less than the allowable error threshold θ, the keyword list creation part 44 terminates the above iterative process from steps S15 to S20. When the process by keyword list creation part 44 is terminated, a process by the frequency threshold calculation part 44-2 is started.

The frequency threshold calculation part 44-2 extracts a retrieval keyword set for each of the attribute values from the retrieval keyword list (step S31). The retrieval keyword set for "JUNIOR HIGH AND HIGH SCHOOL STUDENTS" is {club activity, lesson, school, part time, . . . }, the retrieval keyword set for "COLLEGE STUDENT" is {college, college club, lesson, box lunch, . . . }, the retrieval keyword set for "EMPLOYED PERSON" is {work place, box lunch, commuting, business trip, . . . }, and the retrieval keyword set for "HOUSEWIFE" is {husband, kindergarten, box lunch, supper, . . . }.

After that, the frequency threshold calculation part 44-2 creates a set of the duplicate keywords among the multiple attribute values (step S32). A duplicate keyword set 5a including duplicate keywords among the multiple attribute values is stored in the storage part 130.

Next, the frequency threshold calculation part 44-2 selects one duplicate keyword from the duplicate keyword set, and creates a work table 5b by specifying the blog articles including the duplicate keywords from the attribute-determined article DB 36 (step S33). In the work table 5b, for each of the duplicate keywords, the attribute value and one or more blog articles, which are acquired from the attribute-determined article DB 36, are made to correspond to the duplicate keyword.

The frequency threshold calculation part 44-2 acquires an appearance count (that is, the number of the blog articles) for each of the attribute values with respect to the selected duplicate keyword by referring to the work table 5b for each of the attribute values (step S34). The appearance count indicates the number of blog articles. That is, the pages including the duplicate keyword are counted.

Next, the frequency threshold calculation part 44-2 acquires a Poisson distribution for each of the attribute values pertinent to the selected duplicate keyword (step S35), and acquires the rule of each of the attribute values from the Poisson distribution (step S36). When the rule is acquired in response to a combination of the attribute and the duplicate keyword, the frequency threshold calculation part 44-2 records the acquired rule by corresponding to the combination in the work table 5. When the rule is not acquired in response to the combination, the rule is not recorded. A rule acquisition method will be described later.

The frequency threshold calculation part 44-2 determines whether the rule is acquired with respect to each of the duplicate keywords listed in the work table 5b (step S37). When there is the duplicate keyword, in which the rule has not been acquired, in the work table 5b (NO of step S37), the frequency threshold calculation part 44-2 goes back to step S33, and repeats the above described processes in the same manner.

On the other hand, when the rule is acquired with respect to each of the duplicate keywords listed in the work table 5b (YES of step S37), the frequency threshold calculation part 44-2 creates attribute value vs. keyword table 54-2 (step S38).

The frequency threshold calculation part 44-2 copies the retrieval keyword list 54, and acquires the duplicate keywords, the attribute values, and the rules from the work table 5b. The attribute value vs. keyword table 54-2 is created so that the rule, which is acquired for each of the combinations of the acquired duplicate keyword and the attribute value, is defined.

The frequency threshold calculation part 44-2 sets "≥1" (greater than or equal to 1) with respect to the combinations of the keywords and the attribute values other than the combinations of the duplicate keywords and the attribute values in the attribute value vs. keyword table 54-2.

In the attribute value vs. keyword table 54-2, the rule is indicated by a threshold of the appearance count of the keywords for determining for each of the attribute values whether the attribute value is like. By the attribute value vs. keyword table 54-2, for combinations of the duplicate keyword and each of the multiple attribute values, the rule is defined to one of the combinations. Accordingly, it is possible to effectively use the duplicate keywords, instead of suppressing the use of all duplicate keywords.

When a creation of the attribute value vs. keyword table 54-2 is completed, a process by the frequency threshold calculation part 44-2 ends. That is, when the process by the keyword specifying part 40A ends, a process by the new user replenishment part 40B is started.

A rule acquisition process for acquiring the rule pertinent to the attribute values for each of the duplicate keywords in step S36 will be described with reference to FIG. 20. The rule acquisition process is performed by the frequency threshold calculation part 44-2.

Figure 19:
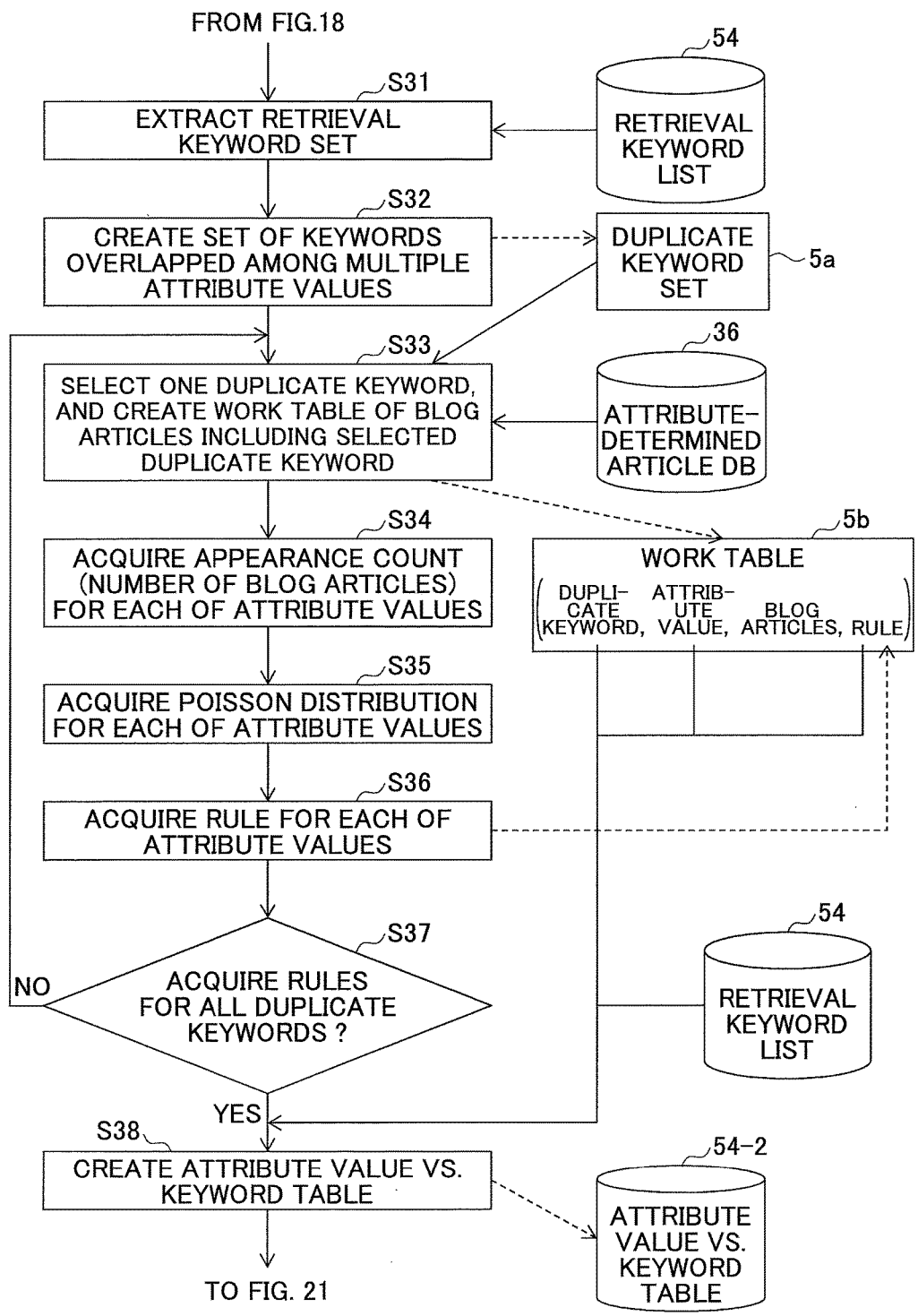
FIG. 19 is a flowchart for explaining the new user replenishment process (part 2)
Figure 20:
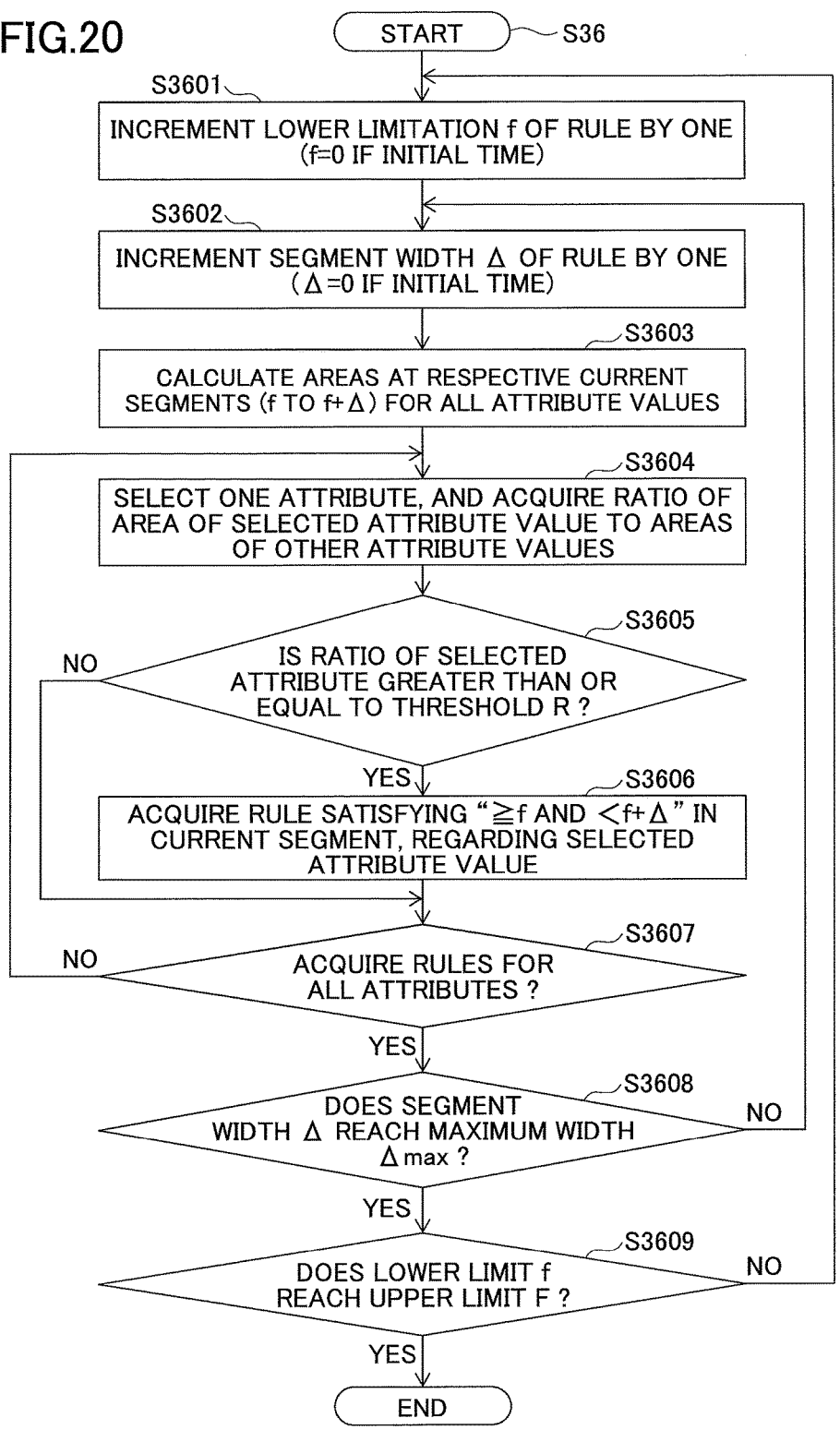
FIG. 20 is a flowchart for explaining the new user replenishment process (part 3)

In FIG. 20, the frequency threshold calculation part 44-2 increments a lower limitation f of the rule (step S3601). The frequency threshold calculation part 44-2 sets the lower limitation f to zero (f=0) at an initial time, and increments the lower limitation f by 1 from a second time. Also, the frequency threshold calculation part 44-2 increments a segment width Δ of the rule by 1 in the Poisson distribution acquired in step S35 in FIG. 19 (step S3602).

Next, the frequency threshold calculation part 44-2 calculates areas at respective current segments (from f to f+Δ) for all attribute values with which the duplicate keyword corresponds (step S3603). After that, the frequency threshold calculation part 44-2 selects one of the attribute values, and acquires a ratio between the area pertinent to the selected attribute value and other areas pertinent to other attribute values (step S3604). The frequency threshold calculation part 44-2 determines whether the ratio of the selected attribute value is greater than or equal to a threshold R (step S3605).

When the ratio of the selected attribute value is less than the threshold R (NO of step S3605), the frequency threshold calculation part 44-2 advances to step S3607. On the other hand, when the ratio of the selected attribute value is greater than or equal to the threshold R (YES of step S3605), the frequency threshold calculation part 44-2 acquires a rule "≥f and f+Δ" (greater than or equal to f and less than f+Δ) at the current segment for the selected attribute value.

The frequency threshold calculation part 44-2 determines whether the rules are acquired for all attribute values (step S3607). When the rule has not been determined for all attribute values (NO of step S3607), the frequency threshold calculation part 44-2 goes back to step S3604, selects a next attribute value, and repeats the above described processes in the same manner.

On the other hand, when the rule is determined for all attribute values (YES of step S3607), the frequency threshold calculation part 44-2 determines whether the segment width Δ reaches a maximum width Δmax (step S3608). When the segment width Δ has not reached the maximum width Δmax (NO of step S3608), the frequency threshold calculation part 44-2 returns to step S3602.

On the other hand, when the segment width Δ reaches the maximum width Δmax (YES of step S3608), the frequency threshold calculation part 44-2 determines whether the lower limit f reaches a upper limit F (step S3609). When the lower limit f has not reached the upper limit F (NO of step S3609), the frequency threshold calculation part 44-2 returns to step S3602, and repeats the above described processes.

On the other hand, when the lower limit f reaches the upper limit F (YES of step S3609), the frequency threshold calculation part 44-2 ends this rule acquisition process.

FIG. 24 is a diagram for explaining an example of the rule acquisition process. In FIG. 24, with respect to each of the three attribute values: the college student, the employed person, and the housewife, the number of the users for each count of the blog articles, in which a certain specific keyword (hereinafter, simply called "specific keyword") appears, is represented by the Poisson distribution.

A college student distribution 2a represents, by the Poisson distribution, the number of the users depending on the count of the blog articles where the specific keyword appear, in the blog articles of the users having the attribute value "college student". An employed person distribution 2b represents, by the Poisson distribution, the number of the users depending on the count of the blog articles where the specific keyword appears, in the blog articles of the users having the attribute value "employed person". An housewife distribution 2c represents, by the Poisson distribution, the number of the users depending on the count of the blog articles where the specific keyword appears, in the blog articles of the users having the attribute value "housewife".

In every the segment width Δ from the count "0" of the blog articles where the specific keyword appear, an area range of the Poisson distribution is expanded. Each time the area range is expanded, the areas are calculated for all attribute values, and are compared among the attribute values.

Figure 21:
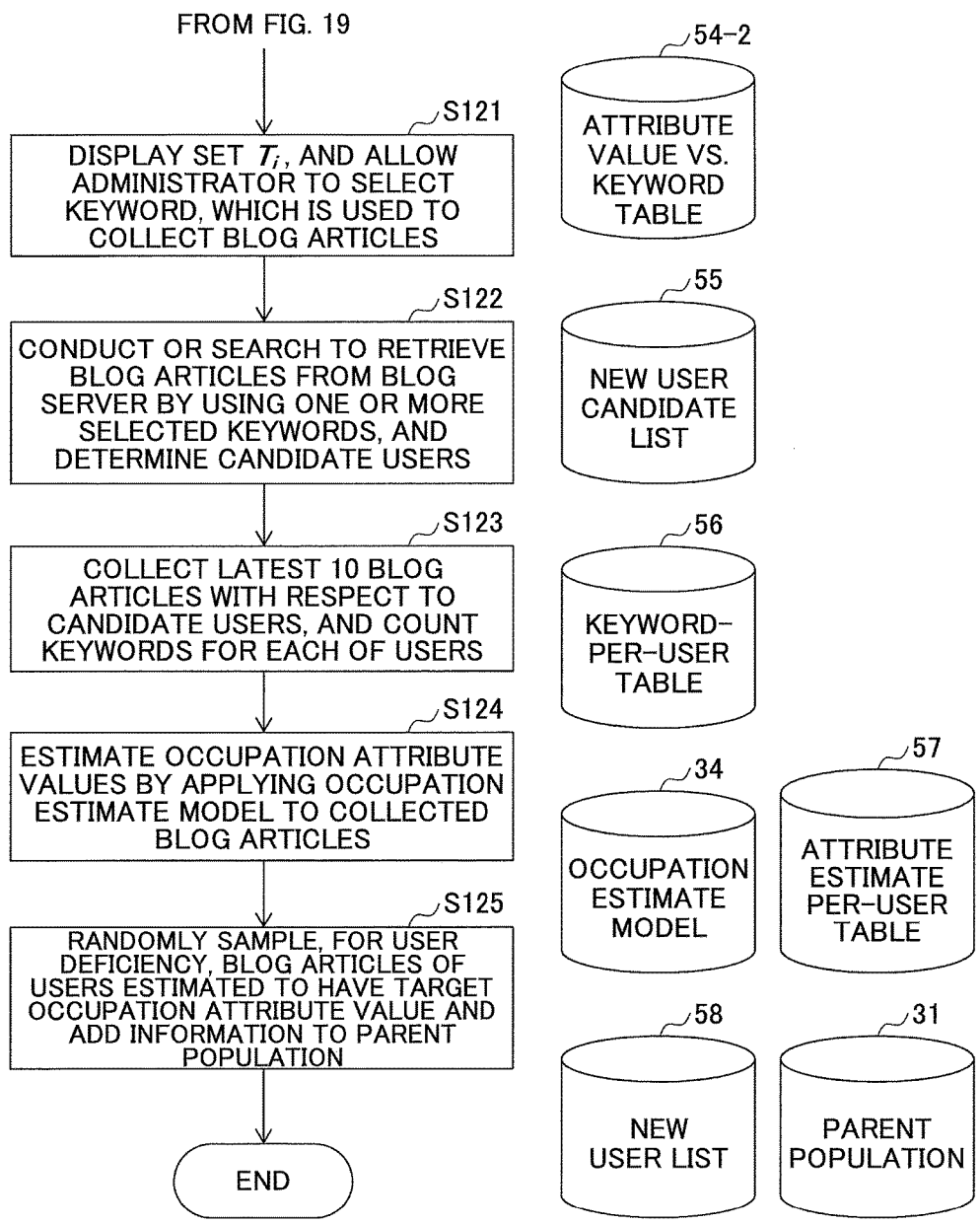
FIG. 21 is a flowchart for explaining the new user replenishment process (part 4)

Processes following step S38 in FIG. 19 will be described with reference to FIG. 21. In FIG. 21, when the new user replenishment part 40B starts the new user replenishment process, the collection part 45 displays the keywords corresponding to the attribute value of the users being the replenishment targets, which is indicated by an administrator among the values of the adjusted attribute, by referring to the attribute value vs. keyword table 54-2, and allows the administrator to select one or more keywords used for retrieval (step S121).

When the attribute value "junior high and high school students" is selected, a selection screen may be displayed at the display device 15 for the administrator to select one attribute value from the retrieval keyword set of the "junior high and high school students"={club activity: ≥1, lesson:

≥7, school: ≥1, part time: ≥1, . . . }. At this selection screen, the administrator is allowed to select the duplicate keyword "lesson" among the attribute values "junior high and high school students" and "college student".

When the attribute value "college student" is selected, the selection screen may be displayed at the display device 15 for the administrator to select one attribute value from the retrieval keyword set of the "college student"={collage: ≥1, college club: ≥1, . . . }. The retrieval keyword set of the "college student" displayed at the display device 15 does not include the duplicate keyword "lesson" among the attribute values "junior high and high school students" and "college student", and the duplicate keyword "box lunch" among the attribute values "junior high and high school students" and "employed person".

When the attribute value "employed person" is selected, the selection screen may be displayed at the display device 15 for the administrator to select one attribute value from the retrieval keyword set of the "employed person"={work place: ≥1, commuting: ≥1, business trip: ≥1, . . . }. The retrieval keyword set of the "employed person" displayed at the display device 15 does not include the duplicate keyword "box lunch" among the attribute values "college student", "employed person", and "housewife".

When the attribute value "housewife" is selected, the selection screen may be displayed at the display device 15 for the administrator to select one attribute value from the retrieval keyword set of the "housewife"={work husband: ≥1, box lunch: ≥3, supper: ≥1, . . . }. At this screen, the administrator is allowed to select the duplicate keyword "box lunch" among the attribute values "college student", "employed person", and "housewife".

As described above, when the duplicate keyword is selectable based on the rule, the duplicate keyword is displayed at the display device 15. When no rule is indicated, the duplicate keyword is not displayed. By this control, in the embodiment, there is no need for the administrator to determine whether the duplicate keyword is included in the retrieval keyword set, and to determine whether to use the duplicate keyword.

When the administrator selects one or more desired keywords from the retrieval keyword set displayed at the display device 15, the collection part 45 creates a query by using the keywords selected by the administrator, and searches for the blogs 3a by accessing the blog servers 3.

The collection part 45 conducts an OR retrieval with the one or more desired keywords of the administrator to collect the blog articles from the blog servers 3 (step S122). The blog articles including the one or more keywords selected by the administrator are retrieved. The users of the retrieved blog articles are determined as candidate users. The new user candidate list 55 is created to indicate IDs of the users of the retrieved blog articles as the candidate users, and is stored in the storage part 130.

The collection part 45 collects top 10 articles related to the candidate users from the blog servers 3, and counts the keywords for each of the users (step S123). That is, the collection part 45 searches for and counts the blog articles associated with each of the user IDs by using the keywords, and creates keyword-per-user table 56 in the storage part 130.

The attribute estimation part 46 applies the occupation estimate model 34 to the collected blog articles by using the keyword-per-user table 56 (step S124). The attribute estimation part 46 specifies the value of the occupation attribute, which has the highest estimate, for each of the user IDs. The attribute estimation part 46 determines the occupation of the user by the specified value of the occupation attribute, and sets the estimated attribute in the attribute estimate per-user table 57.

In the example illustrated in FIG. 16, with respect to the user ID "00002", the estimate "0.53" for the value "JUNIOR HIGH AND HIGH SCHOOL STUDENTS" indicates a highest value. Hence, the value "JUNIOR HIGH AND HIGH SCHOOL STUDENTS" is set by corresponding to the user ID "00002". With respect to the user ID "00014", the value "OTHERS" is set to the estimated attribute. With respect to the user ID "00383", the value "JUNIOR HIGH AND HIGH SCHOOL STUDENTS" is set.

After that, the sampling part 47 randomly samples, for a user deficiency, the blog articles of the users, who are estimated to have a target value of the occupation attribute, and adds the user IDs of different users from the sampled blog articles to the parent population 31 (step S125).

If there is the user shortage pertinent to the value "JUNIOR HIGH AND HIGH SCHOOL STUDENTS" of the occupation attribute, the sampling part 47 extracts the user IDs, to which the value "JUNIOR HIGH AND HIGH SCHOOL STUDENTS" is set to the estimated attribute in the attribute estimate per-user table 57, and stores the extracted user IDs to the new user list 58 in the storage part 130. The sampling part 47 replenishes the parent population 31 by using the new user list 58.

In the embodiment, instead of randomly selecting the users as the collection targets, it is possible to specify the users, who posted the blog articles including the characteristic keywords pertinent to the users desired to replenish, more than the frequency threshold.

Next, another data configuration example of the attribute value vs. keyword table 54-2 will be described. The other data configuration example may be used to specify the users of the collection target based on the rules indicating an count arrange of the blog articles. FIG. 25 is a diagram illustrating the other data configuration example of the attribute value vs. keyword table. Different from the attribute value vs. keyword table 54-2 depicted in FIG. 13, in an attribute value vs. keyword table 54-2a illustrated in FIG. 25, an upper limit and an lower limit is set for the count of the blog articles.

In the data configuration example in FIG. 25, the rule of "≥7 and <12" (greater than or equal to 7 and less than 12) is set for the keyword "LESSON" of the attribute value "JUNIOR HIGH AND HIGH SCHOOL STUDENTS". In a case of replenishing the population with the users having the attribute value "JUNIOR HIGH AND HIGH SCHOOL STUDENTS", targets are the users, in which the count of the blog articles where the keyword "LESSON" appears is "≥7 and <12" (greater than or equal to 7 and less than 12).

With respect to the keyword "LESSON" of the attribute value "COLLEGE STUDENT", a rule "≥0 and <2" (greater than or equal to 0 and less than 2) or a rule "≥5 and <6" (greater than or equal to 5 and less than 6) is applied. In a case of replenishing the parent population 31 with the IDs of the users of the college students, the users are the target to search for, in which the blog articles being "≥0 and <2" or "≥5 and <6" include the keyword "LESSON" in their blog articles.

Also, the rule "≥0 and <1" is set to the keyword "BOX LUNCH" of the attribute value "COLLEGE STUDENT". In a case of replenishing the parent population 31 with the IDs of the users of the college students, the users are the target to search for, in which the blog article being "≥0 and <1" includes the keyword "BOX LUNCH" in their blog articles.

With respect to the keyword "BOX LUNCH" of the attribute value "EMPLOYED PERSON", the rule is indicated by the blank. In a case of replenishing the parent population 31 with the IDs of the users of the employed persons, the word "BOX LUNCH" is not used for a retrieval condition.

With respect to the keyword "BOX LUNCH" of the attribute value "HOUSEWIFE", the rule "≥3 and <8" is set. In a case of replenishing the parent population 31 with the IDs of the users of the housewives, the users are the target to search for, in which the blog article being "≥3 and <8" includes the keyword "BOX LUNCH" in their blog articles.

By using the rules indicating the lower limits as illustrated in FIG. 13, the duplicate keywords "LESSON" and "BOX LUNCH" are not used. Instead, by referring to the attribute value vs. keyword table 54-2a, it is possible to appropriately use the duplicate keywords "LESSON" and "BOX LUNCH".

As described above, by setting the upper limit and the lower limit, even in a case of using the duplicate keyword, it is possible to precisely replenish the parent population 31 with the IDs of the users having the attribute value.

According to the present invention, in the data collection apparatus 100, it is possible to maintain the constant attribute ratio in the parent population 31 being the research subject, and it is possible to replenish the population of the IDs of the users having the insufficient value in the occupation attribute.

A related technology for randomly setting the keywords collects the user information specifying respective users who post the blog articles related a specific topic alone. As a result, the parent population in the related technology may not precisely represent the actual life condition of people. In the embodiment, the keywords are set so that the bias of the trend of the posting contents is avoided. Hence, it is possible to maintain the constant attribute ratio in the parent population 31 being the research subject. Accordingly, the above described problem pertinent to the related technology is overcome.

It is possible to conduct a population formation in consideration with the attribute ratio in the parent population being the research subject.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A population formation method by a computer, the method comprising:
   extracting one or more keywords from public information of a first provider group of providers including a provider for which an attribute value regarding a first attribute is calculated as corresponding to a predetermined attribute value, the first attribute being an attribute with respect to each provider providing the public information, the attribute value of the first attribute being changed with time;
   acquiring a number of sets of the public information including a duplication keyword for each of a plurality of attribute values, with respect to the duplicate keyword redundant to two or more attribute values in the plurality of attribute values among the one or more keywords;
   acquiring a distribution representing a relationship between a number of the providers of the public information including the duplicate keyword and the number of sets of the public information, for each of the two or more attribute values for each duplicate keyword;
   determining usability of the duplicate keyword used to collect the public information for each of the two or more attribute values, by comparing respective distributions among the two or more attribute values;
   forming one or more second provider groups of providers of the public information including a keyword selected depending on a determination of the usability of the duplicate keyword with respect to new public information;
   specifying a provider group having a predetermined similar relationship with the first provider group from the one or more second provider groups based on a distribution of the attribute value of a different attribute from the first attribute; and
   forming a new provider group corresponding to the first provider group by information of the providers, for whom the attribute value pertinent to the first attribute calculated as corresponding to the predetermined attribute value, among providers included in the specified provider group.

2. The population formation method as clamed in claim 1, wherein
   the distribution is a Poisson distribution, and
   the computer sets a rule indicating a restriction of selecting the duplicate keyword as the keyword for each of the plurality of attribute values of the first attributes by using the determination of the usability of the duplicate keyword, and forms the one or more second provider groups by referring to the rule.

3. The population formation method as clamed in claim 2, wherein the computer
   acquires Poisson distributions representing appearance trends with respect to the plurality of attribute values, respectively, for the duplicate keyword; and
   sets the rule indicating a lower limit of an appearance frequency with respect to a characteristic appearance trend for each of the plurality of attribute values, which has the characteristic appearance trend based on the Poisson distribution in comparison with other attribute values.

4. The population formation method as clamed in claim 2, wherein the computer
   acquires Poisson distributions representing appearance trends with respect to the plurality of attribute values, respectively, for the duplicate keyword; and
   sets the rule indicating a range of an appearance frequency with respect to a characteristic appearance trend for each of the plurality of attribute values, which has the characteristic appearance trend based on the Poisson distribution in comparison with other attribute values.

5. The population formation method as clamed in claim 3, wherein the range of the appearance frequency is indicated by more than one rule.

6. A population formation apparatus comprising:
   a memory; and
   a processor coupled to the memory and the processor configured to executes a process including extracting one or more keywords from public information of a first provider group of providers including a provider for which an attribute value regarding a first attribute is calculated as corresponding to a predetermined attribute value, the first attribute being an attribute with respect to each provider providing the public information, the attribute value of the first attribute being changed with time;

acquiring a number of sets of the public information including a duplication keyword for each of a plurality of attribute values, with respect to the duplicate keyword redundant to two or more attribute values in the plurality of attribute values among the one or more keywords;

acquiring a distribution representing a relationship between a number of the providers of the public information including the duplicate keyword and the number of sets of the public information, for each of the two or more attribute values for each duplicate keyword;

determining usability of the duplicate keyword used to collect the public information for each of the two or more attribute values, by comparing respective distributions among the two or more attribute values;

forming one or more second provider groups of providers of the public information including a keyword selected depending on a determination of the usability of the duplicate keyword with respect to new public information;

specifying a provider group having a predetermined similar relationship with the first provider group from the one or more second provider groups based on a distribution of the attribute value of a different attribute from the first attribute; and forming a new provider group corresponding to the first provider group by information of the providers, for whom the attribute value pertinent to the first attribute calculated as corresponding to the predetermined attribute value, among providers included in the specified provider group.

7. A non-transitory computer readable recording medium that stores a population formation program that causes a computer to execute a process comprising:

extracting one or more keywords from public information of a first provider group of providers including a provider for which an attribute value regarding a first attribute is calculated as corresponding to a predetermined attribute value, the first attribute being an attribute with respect to each provider providing the public information, the attribute value of the first attribute being changed with time;

acquiring a number of sets of the public information including a duplication keyword for each of a plurality of attribute values, with respect to the duplicate keyword redundant to two or more attribute values in the plurality of attribute values among the one or more keywords;

acquiring a distribution representing a relationship between a number of the providers of the public information including the duplicate keyword and the number of sets of the public information, for each of the two or more attribute values for each duplicate keyword;

determining usability of the duplicate keyword used to collect the public information for each of the two or more attribute values, by comparing respective distributions among the two or more attribute values;

forming one or more second provider groups of providers of the public information including a keyword selected depending on a determination of the usability of the duplicate keyword with respect to new public information;

specifying a provider group having a predetermined similar relationship with the first provider group from the one or more provider groups based on a distribution of the attribute value of a different attribute from the first attribute; and forming a new provider group corresponding to the first provider group by information of the providers, for whom the attribute value pertinent to the first attribute calculated as corresponding to the predetermined attribute value, among providers included in the specified provider group.

* * * * *